United States Patent
Hansen et al.

(10) Patent No.: US 9,142,224 B2
(45) Date of Patent: Sep. 22, 2015

(54) MAGNETIC-TAPE DRIVE AND MAGNETIC-TAPE HEAD COMPATIBLE WITH MULTIPLE TAPE FORMATS

(75) Inventors: Lawrence A. Hansen, Meridian, ID (US); Paul W. Poorman, Meridian, ID (US); Jeffrey S. McAllister, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1028 days.

(21) Appl. No.: 13/124,646

(22) PCT Filed: Oct. 24, 2008

(86) PCT No.: PCT/US2008/012131
§ 371 (c)(1),
(2), (4) Date: Apr. 15, 2011

(87) PCT Pub. No.: WO2010/047679
PCT Pub. Date: Apr. 29, 2010

(65) Prior Publication Data
US 2011/0199703 A1    Aug. 18, 2011

(51) Int. Cl.
*G11B 5/008*     (2006.01)

(52) U.S. Cl.
CPC ........ *G11B 5/00826* (2013.01); *G11B 5/00878* (2013.01)

(58) Field of Classification Search
None
See application file for complete search history.

(56) References Cited

U.S. PATENT DOCUMENTS

| | | | |
|---|---|---|---|
| 5,371,638 A | 12/1994 | Saliba | |
| 6,188,532 B1 | 2/2001 | Albrecht et al. | |
| 6,992,857 B2 * | 1/2006 | Knowles et al. | 360/77.12 |
| 7,414,811 B2 * | 8/2008 | Biskeborn | 360/129 |
| 7,529,060 B2 * | 5/2009 | Simmons et al. | 360/75 |
| 7,570,450 B2 * | 8/2009 | Koeppe | 360/75 |
| 7,602,579 B2 * | 10/2009 | Biskeborn et al. | 360/77.12 |
| 7,681,793 B2 * | 3/2010 | Biskeborn et al. | 235/449 |
| 7,724,465 B2 * | 5/2010 | Koeppe | 360/75 |
| 7,766,236 B2 * | 8/2010 | Biskeborn et al. | 360/61 |
| 7,782,564 B2 * | 8/2010 | Biskeborn et al. | 360/77.12 |

(Continued)

FOREIGN PATENT DOCUMENTS

| | | |
|---|---|---|
| JP | 1999-273023 | 10/1999 |
| JP | 2002-500803 | 1/2002 |

(Continued)

OTHER PUBLICATIONS

Extended Search Report for application No. 08877605.9, dated Jun. 6, 2012, 5 pages.

(Continued)

*Primary Examiner* — Wayne Young
*Assistant Examiner* — James L Habermehl
(74) *Attorney, Agent, or Firm* — Olympic Patent Works PLLC

(57) ABSTRACT

Embodiments of the present invention are directed to the design and implementation of backward-compatible magnetic tape drives (102) that are read/write compatible with a current magnetic-tape format (1820) as well as one or more previous magnetic-tape formats (1802 and 1804). Embodiments of the present invention include read/write tape-head configurations (1902, 1904, 1906, 1908-1923, 1930, 1932, 1934, 2102) and corresponding magnetic-tape-drive-component features (518) that allow a magnetic-tape drive to read and write magnetic tapes formatted according to different formats.

22 Claims, 23 Drawing Sheets

(56) References Cited

U.S. PATENT DOCUMENTS

| | | | |
|---|---|---|---|
| 7,852,599 B2* | 12/2010 | Bui et al. | 360/48 |
| 8,054,579 B2* | 11/2011 | Biskeborn | 360/122 |
| 8,159,770 B2* | 4/2012 | Bui et al. | 360/63 |
| 8,233,246 B2* | 7/2012 | Koeppe | 360/316 |
| 8,254,058 B2* | 8/2012 | Biskeborn | 360/122 |
| 8,587,902 B2* | 11/2013 | Biskeborn et al. | 360/241.1 |
| 8,587,905 B2* | 11/2013 | Koeppe | 360/316 |
| 2005/0168865 A1 | 8/2005 | Simmons, Jr. et al. | |
| 2008/0030886 A1 | 2/2008 | Biskeborn | |
| 2008/0252357 A1* | 10/2008 | Biskeborn et al. | 327/419 |
| 2014/0029135 A1* | 1/2014 | Koeppe | 360/90 |

FOREIGN PATENT DOCUMENTS

| | | |
|---|---|---|
| JP | 2006-221729 | 8/2006 |
| WO | WO-2010047679 A1 | 4/2010 |

OTHER PUBLICATIONS

EP 4MO Office Action, 08877605.9, Jun. 27, 2014, 3 pps.
International Preliminary Report on Patentability w/Written Opinion, PCT/US2008/012131, May 5, 2011, 5 pps.

* cited by examiner

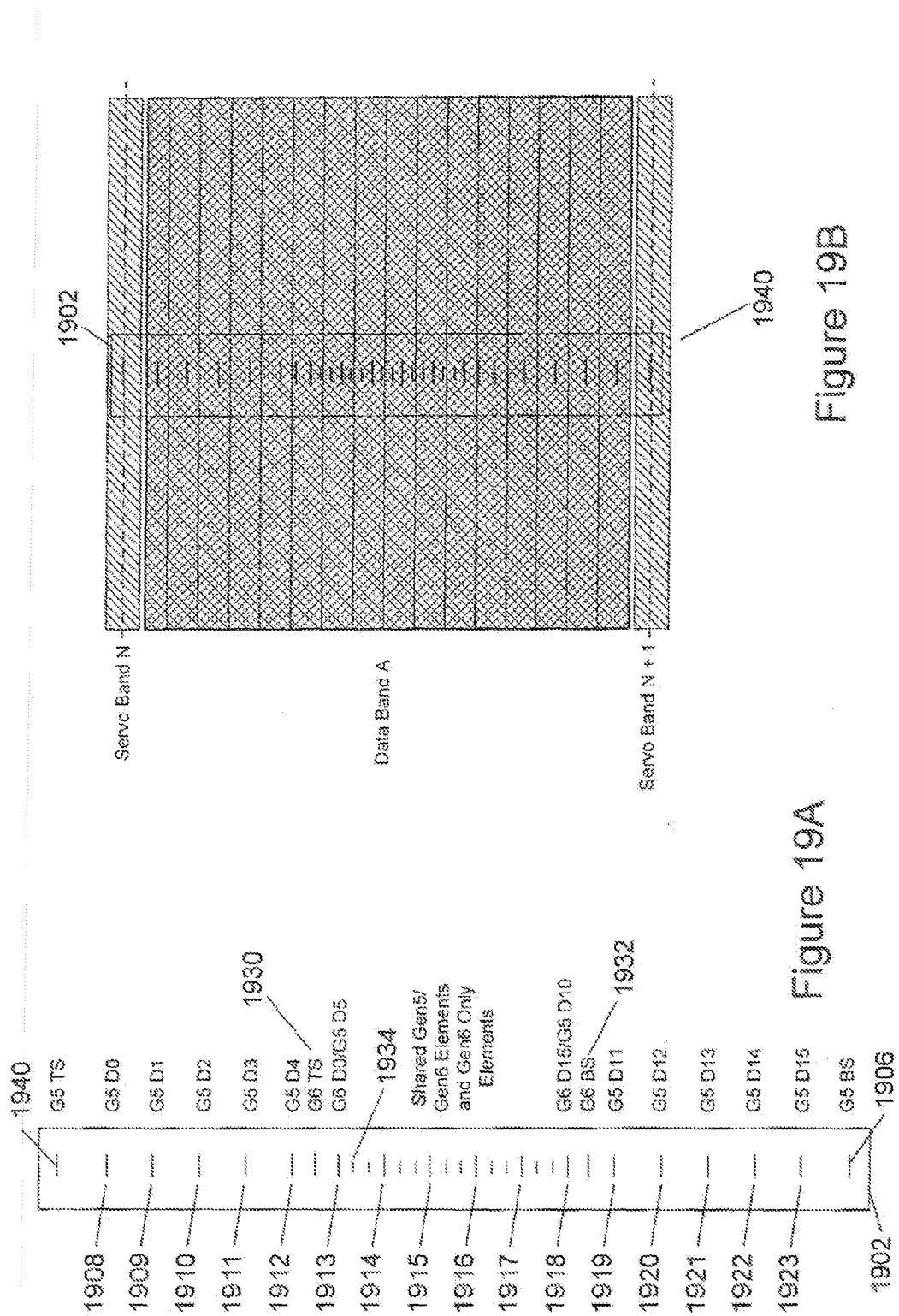

MAGNETIC-TAPE DRIVE AND MAGNETIC-TAPE HEAD COMPATIBLE WITH MULTIPLE TAPE FORMATS

TECHNICAL FIELD

The present invention is related generally to tape-drive technology.

BACKGROUND

While the present invention is generally applicable to a variety of different types of magnetic-tape storage devices, embodiments are discussed, below, in the context of the linear tape-open ("LTO") magnetic-tape storage technology developed in the late 1990's as an open-standards alternative to proprietary magnetic-tape technologies. The LTO magnetic-tape storage technology is based on ½" magnetic tape stored in a single-reel cartridge that is inserted into, and removed from, an LTO magnetic-tape drive. LTO magnetic-tape drives feature high rates of data transfer and LTO tape cartridges provide very large storage capacities. The LTO magnetic-tape storage devices find widespread use in a variety of data-archiving and data-backup applications.

The LTO magnetic-tape storage technology has evolved through four generations of magnetic-tape formats and magnetic-tape-drive implementations, referred to as "LTO-1," "LTO-2," "LTO-3," and "LTO-4." Additional LTO-5, LTO-6, and LTO-7 generations are currently in various stages of development. LTO-1 tape cartridges hold up to 100 gigabytes ("GB") of data, with a maximum data-transfer rate of 15 megabytes ("MB") per second. LTO-1 magnetic-tape format provides 384 data tracks, eight pairs of read/write element pairs per tape head, and a linear data density of 4880 bits/mm. Current LTO-4 magnetic-tape storage technology provides for storage of up to 800 GB per magnetic-tape cartridge and a maximum data-transfer rate of 120 MB per second. The LTO-4 magnetic-tape format provides 896 data tracks and 16 read/write element pairs per head, and provides a linear data density of 13,520 bits/mm. Each successive LTO generation provides a significantly higher track density by using additional numbers of increasingly narrower data tracks, correspondingly narrower read/write tape-head elements. Occasionally, as was the case with LTO 3, a greater number of read/write tape-head elements per tape head are included in the tape head, to allow for simultaneous access to a greater number of data tracks and higher data transfer rate for a given tape speed.

Backward compatibility of newer-generation tape drives with older-generation magnetic tapes is an expected and commercially necessary feature of tape drives. In general, a tape drive of generation n needs to be write-compatible with at least the generation n-1 magnetic-tape format and needs to be read-compatible with the generation n-1 magnetic-tape format and generation n-2 magnetic-tape format. Over the first four LTO generations, the backward-compatibility issues have been handled primarily by developing increasing narrower read/write elements within tape heads, by increasing the number of read/write elements within tape heads, and by appropriate modifications to internal magnetic-tape-drive components, including the servo controller, micro-controller routines, and internal signal paths. However, changes in the magnetic-tape format expected for generation LTO-6 are significant, and the changes present a significant technology challenge to producing an LTO-6 magnetic-tape drive head that is compatible with both LTO-6 and with LTO-5/4 magnetic tapes. The researchers and developers currently designing and implementing the LTO-6 generation of tape drives are therefore seeking designs and technologies to allow an LTO-6 magnetic-tape drive to read and write magnetic tapes formatted according to both the LTO-6 format and the LTO-5/4 format. Similar challenges are being addressed with regard to LTO-7 magnetic-tape drives. While these backward-compatibility issues have arisen in the context of the LTO magnetic-tape storage technology, compatibility issues similarly arise in other magnetic-tape storage technologies.

SUMMARY

Certain embodiments of the present invention are directed to a multi-magnetic-tape-format-compatible magnetic-tape drive that accesses, in parallel, two servo bands and one data track of each data sub-band within a data band selected from any of the data bands of at least two differently-formatted magnetic tapes. Other embodiments of the present invention are directed to a magnetic-tape head used in an electromechanical tape-access component within a magnetic-tape drive that accesses, in parallel, two servo bands and one data track of each data sub-band within a data band selected from any of the data bands of at least two differently-formatted magnetic tapes.

BRIEF DESCRIPTION OF THE DRAWINGS

In order that the invention might be well understood, various embodiments thereof will now be provided, by way of example only, with reference to the accompanying drawings, in which:

FIGS. 19A-B illustrates a tape head configuration that represents one embodiment.

DETAILED DESCRIPTION

Embodiments are directed to magnetic-tape drives that are read/write compatible with multiple magnetic-tape formats. The embodiments are discussed, below, in the context of the LTO magnetic-tape storage technology, although embodiments are applicable to a wide variety of different magnetic-tape storage technologies.

Figure 1:
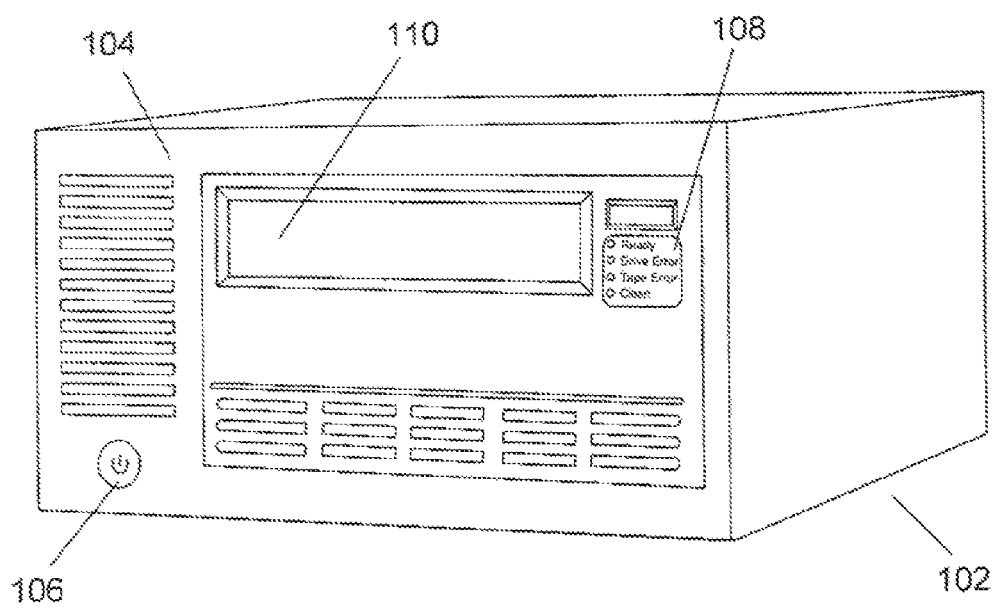
FIG. 1 shows an exterior view of a magnetic-tape drive that reads and writes data to a magnetic tape stored within a magnetic-tape cartridge.
Figure 2:
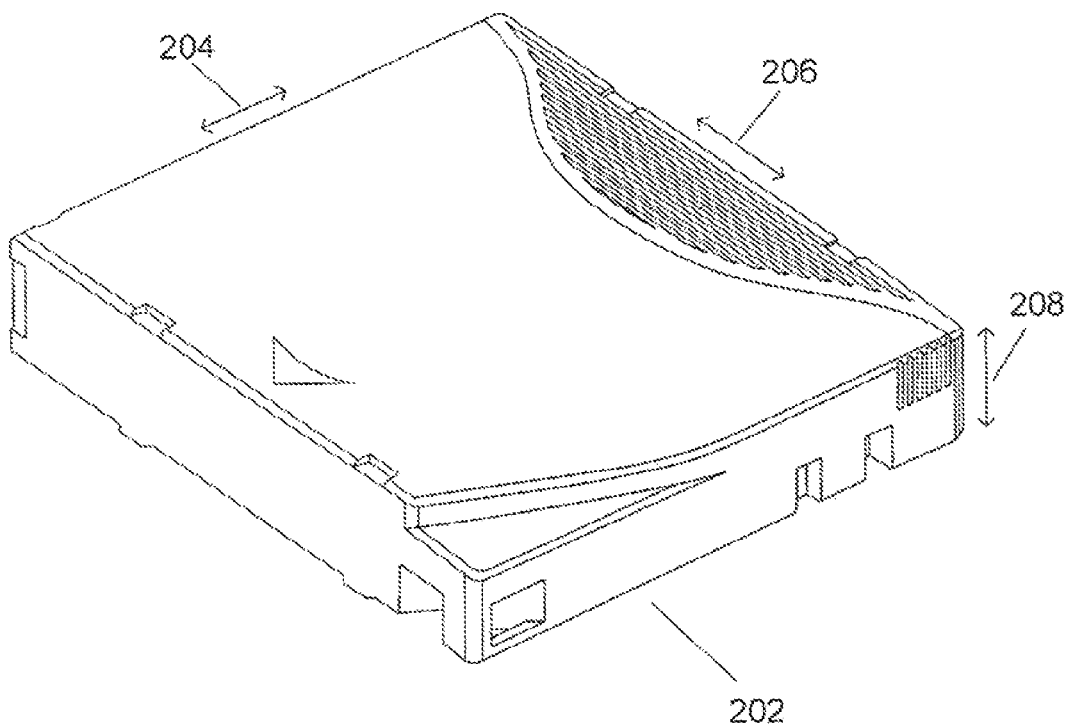
FIG. 2 shows an exterior view of a magnetic-tape cartridge.
Figure 3:
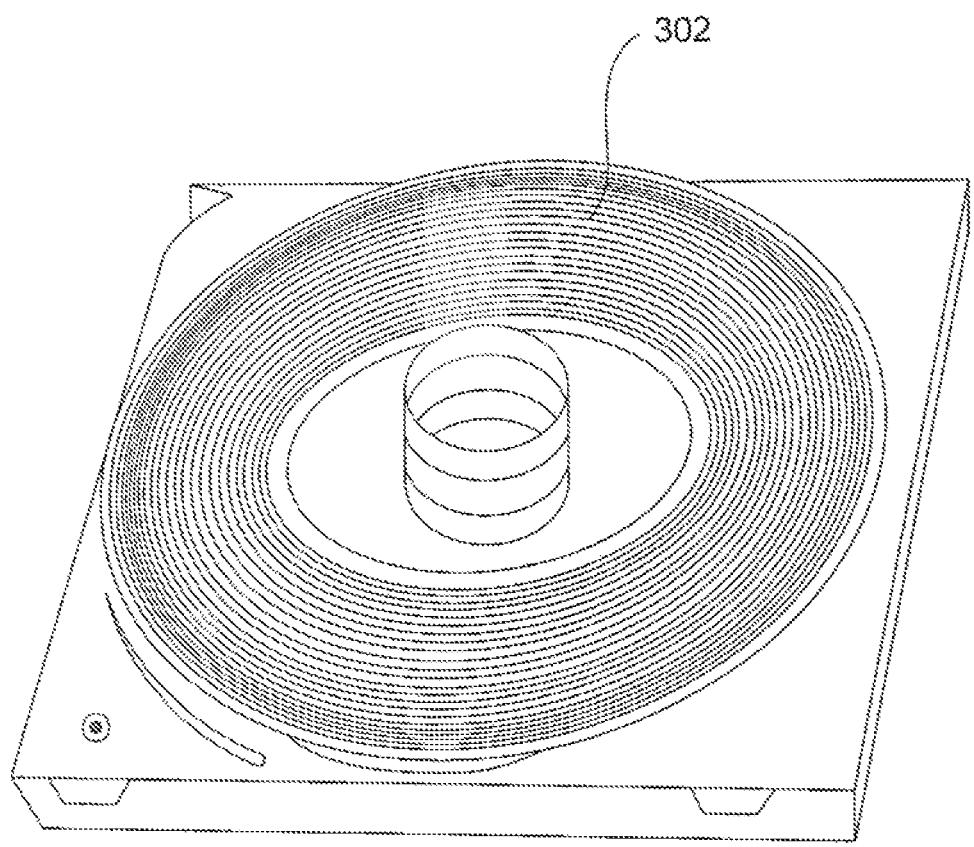
FIG. 3 shows a magnetic-tape cartridge from which the top portion of the plastic housing has been removed to reveal a magnetic tape spooled within the cartridge.
Figure 4:
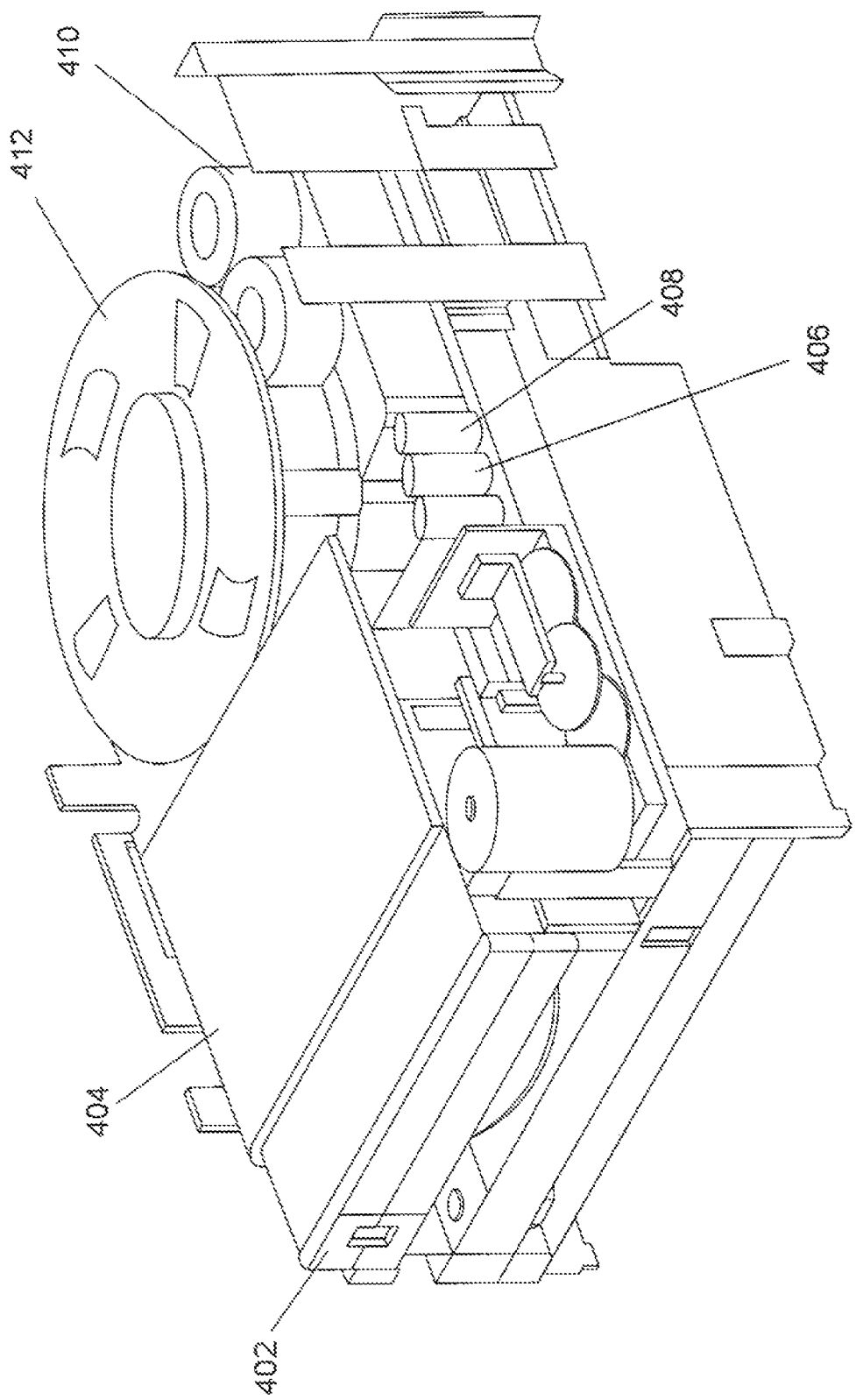
FIG. 4 shows the internal components of a magnetic-tape drive.

FIG. 1 shows an exterior view of a magnetic-tape drive that reads and writes data to a magnetic tape stored within a magnetic-tape cartridge. The magnetic-tape drive 102 includes a front panel 104 with a power button 106, a small light-emitting-diode ("LED") display panel 108, and an aperture 110 into which magnetic-tape cartridges are inserted and from which magnetic-tape cartridges are removed. FIG. 2 shows an exterior view of a magnetic-tape cartridge. An LTO-4 magnetic-tape cartridge 202 has a length 204 of 10.2 centimeters, a width 206 of 10.54 centimeters, and a height 208 of 2.15 centimeters. FIG. 3 shows a magnetic-tape cartridge from which the top portion of the plastic housing has been removed to reveal a magnetic tape spooled within the cartridge. A single tape 302 of up to 820 meters in length is wound about a single spool. FIG. 4 shows the internal components of a magnetic-tape drive. The cartridge 402 is loaded into a loader tray 404 by a motorized loading mechanism. When a cartridge is loaded, the cartridge housing is opened and the tape leader is extracted and fed past a leader block 406, around a first guide roller 408, over a tape head (not shown in FIG. 4), past a second guide roller 410, and into to a take-up reel 412. As discussed in greater detail below, a tape is written in serpentine fashion in multiple passes, each pass involving spooling the tape from the cartridge to the take-up reel, in a forward direction, or spooling the tape from the take-up reel back to the cartridge, in a reverse direction. An LTO-4 generation tape, for example, is fully written in 28 cycles, each cycle comprising writing of 16 data tracks in the forward direction from the beginning of a user-data region to the end of the user-data region and writing of 16 data tracks in the reverse direction from the end of the user-data region to the beginning of the user-data region.

Figure 5:
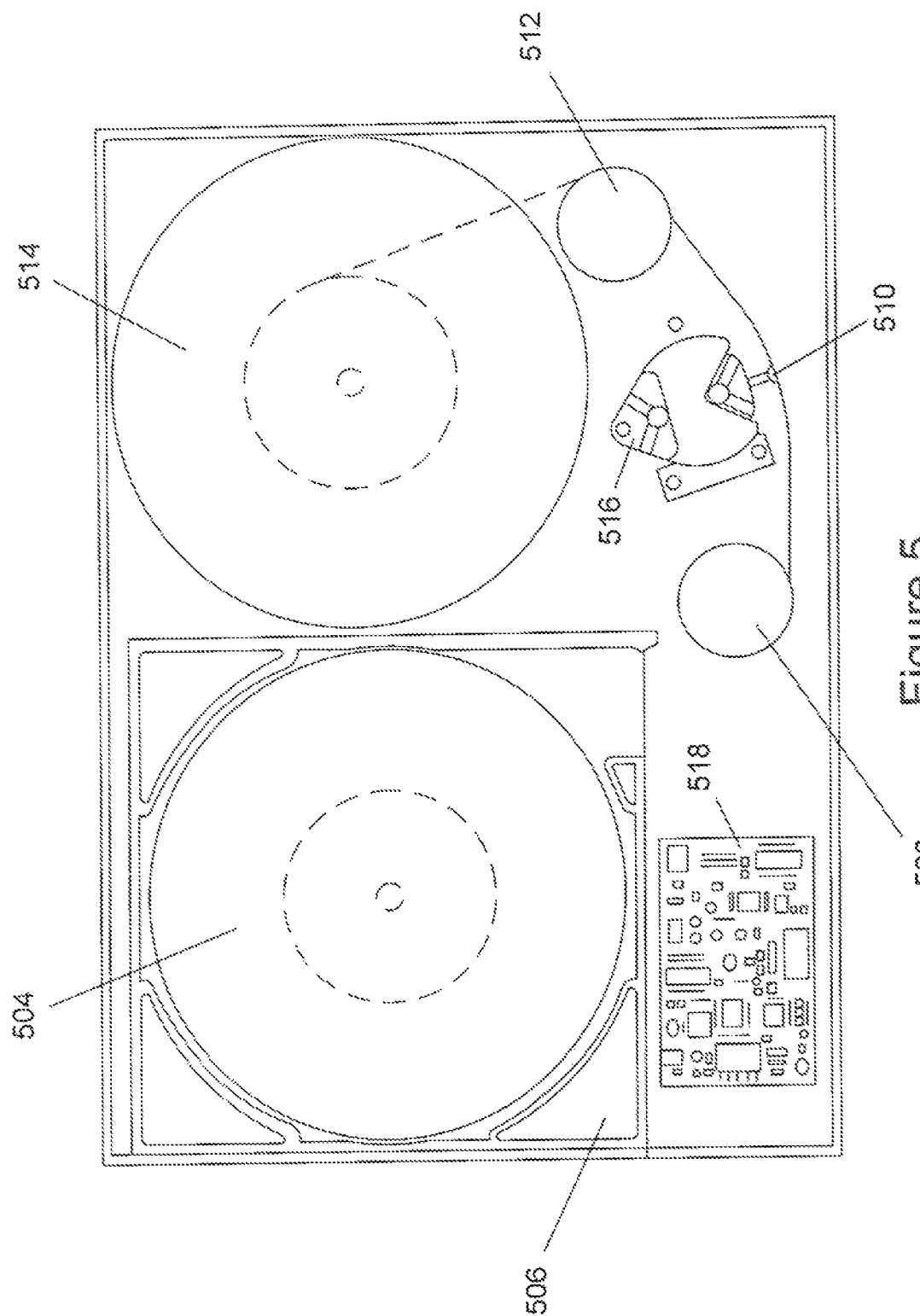
FIG. 5 shows the tape path within a magnetic-tape cartridge.

FIG. 5 shows the tape path within a magnetic-tape cartridge. The magnetic tape is initially wound on the supply reel 504 within the magnetic-tape cartridge 506. When loaded into the magnetic-tape drive, a mechanical mechanism opens the cartridge, grasps a leader pin mounted to the leader portion of the magnetic tape, and threads the tape around a first guide roller 508, over the tape head 510, and around a second guide roller 512 to the take-up reel 514. As discussed in greater detail, below, the tape head 510 includes an array of read/write elements that write data to, and read data from, the magnetic tape. The tape head 510 is moved in a vertical direction, normal to the plane of the drawing, by an actuator 516 in order to access different sets of tracks for reading and writing. The actuator 516 is, in turn, controlled by a tape-drive controller 518 that includes one or more processors, electronic memory, and logic circuitry for receiving data from an external host computer system, processing the data into data sets, writing the data sets to the magnetic tape by electromechanical control of the tape head 510, reading data sets from the magnetic tape by electromechanical control of the tape head 510, and processing the data sets to retrieve the host data that is returned to the host computer system.

Figure 6:
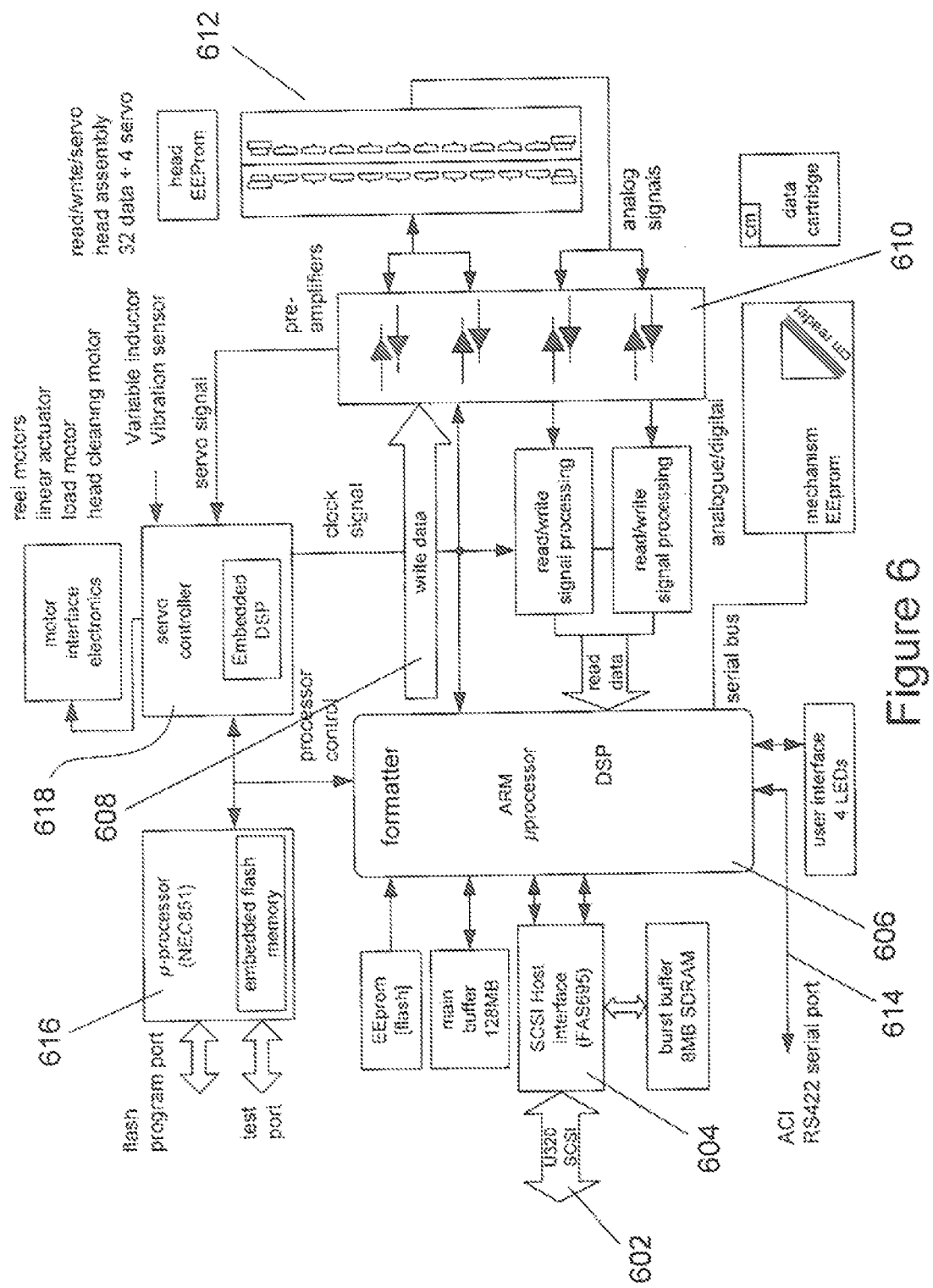
FIG. 6 provides a block diagram of the internal components of a magnetic-tape drive.

FIG. 6 provides a block diagram of the internal components of a magnetic-tape drive. The tape drive is connected to a host computer through a small-computer-system-interface ("SCSI"), Fibre Channel ("FC"), or Serial Attached SCSI ("SAS") communications medium 602 and the appropriate host interface 604. Data received from one or more host computers through the communications interface is processed and formatted by a formatter component 606 into codeword quads, discussed below, that are transferred through an internal communications medium 608 to a bank of preamplifiers 610 that emit analog signals to the read/write elements of the tape head 612. The analog signals, within the read/write elements of the tape head, produce localized magnetic fields over small regions of a ferromagnetic layer of the tape, reversibly changing the magnetic state of the regions to store bits of data. Similarly, data is read by the tape head 612 in the form of analog signals generated within the read/write elements by localized magnetic fields within tiny regions of the magnetic tape. The analog signals are passed back to the bank of preamplifiers 610, the amplified signals then converted to digital signals and passed back to the formatter 606 for processing data sets back into host data that is packed for transmission thorough the communications medium to an external host computer. There is a separate automation control interface 614 that allows the drive to be coordinated for operation within a tape-drive library. Control programs that execute on a microprocessor 616 provide overall control of the magnetic tape drive, including control of the communications medium, formatter, servo controller 618, and internal data transfer. The servo controller 618 receives signals from servo elements on the tape head and responds to the signals by controlling tape-head positioning actuators, drive motors, and other electromechanical components. The servo-controller feedback system provides precise tracking of data tracks on the magnetic tape despite non-uniformities in the magnetic tape. The speed at which the tape is passed over the tape head is controlled by the microprocessor in order to match the data-input speed through the host interface, when writing data to the magnetic tape, and to match the data-consumption rate of an external host computer through the host interface, when reading data from the magnetic tape.

Figure 7:
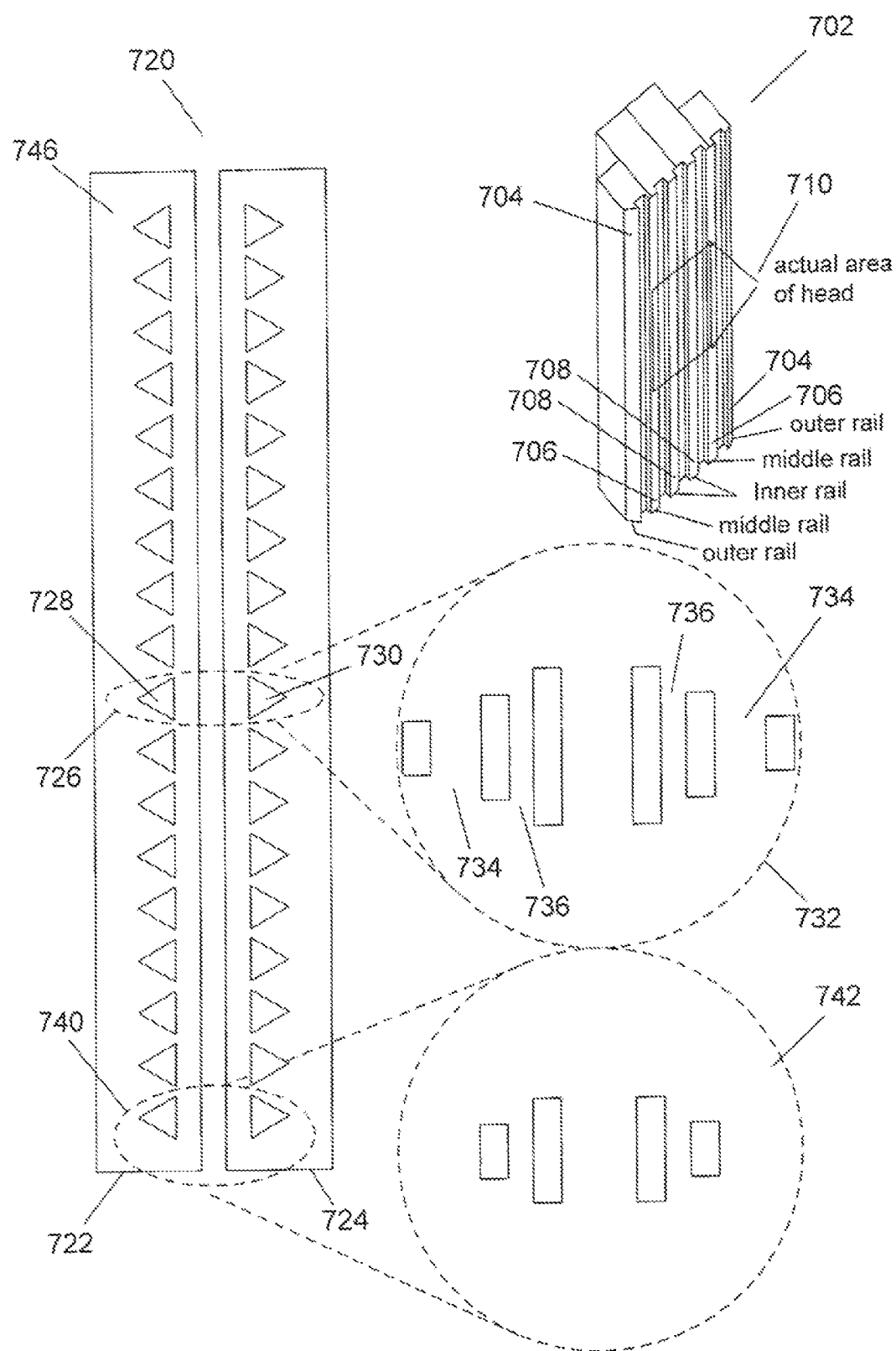
FIG. 7 illustrates a tape head.

FIG. 7 illustrates a tape head. The active components of the tape head 702 are fabricated onto the ceramic substrate of the tape head using photolithography techniques. The active data read and servo head elements are magneto-resistive devices, within the semiconductor tape head, which exhibit variable resistance that depends on the magnetic fields to which the tape-head elements are exposed. Each data read and servo head element requires a small sense current enabling the detection of resistance changes when data is read from a magnetic tape. Each data write element comprises a tiny copper coil which generates a magnetic field when supplied with an electric current, when data is written to a magnetic tape. The surface of the tape head may be corrugated, as shown in FIG. 7, including a pair of rounded outer rails 704, a pair of middle rails 706, and a pair of inner rails 708. The active portion of the tape head 710 comprises the central portion of the two inner rails. The active portion of the tape head 720 is represented in FIG. 7 as two vertical arrays of tape-head elements. The first vertical array 722 is fabricated on the left-hand middle rail, and the second array of vertical element 724 is fabricated on the right-hand middle rail. In an LTO-4 generation tape head, the tape-head elements are horizontally aligned to form tape-head-element pairs. There are two types of tape-head element pairs. A read/write tape-head-element pair 726 includes a left-hand read/write element 728 and a right-hand read/write element 730. A closer view 732 of the read/write element pair 726 shows that each read/write element includes a WRITE gap 734 and a READ gap 736. A servo tape-head-element pair 740 consists of a pair of READ elements, shown in a closer view 742 in FIG. 7. When the magnetic tape moves past the tape head in a left-to-right direction, the left-hand read/write elements of each pair of read/write elements, positioned within the left-hand vertical array 722, write data to the magnetic tape that is then immediately read, for error-detection purposes, by the corresponding right-hand read/write elements of each read/write element pair, positioned within the right-hand vertical column 724. When the magnetic tape passes over the tape head in the opposite direction, the operational roles of the read/write elements in each read/write element pair is reversed. Two servo tape-head-element pairs 740 and 746 read information from two servo bands within a formatted magnetic tape, as discussed below, and the 16 read/write element pairs, including read/write-element pair 726, each writes data to and/or reads data from a different data track.

Figure 8:
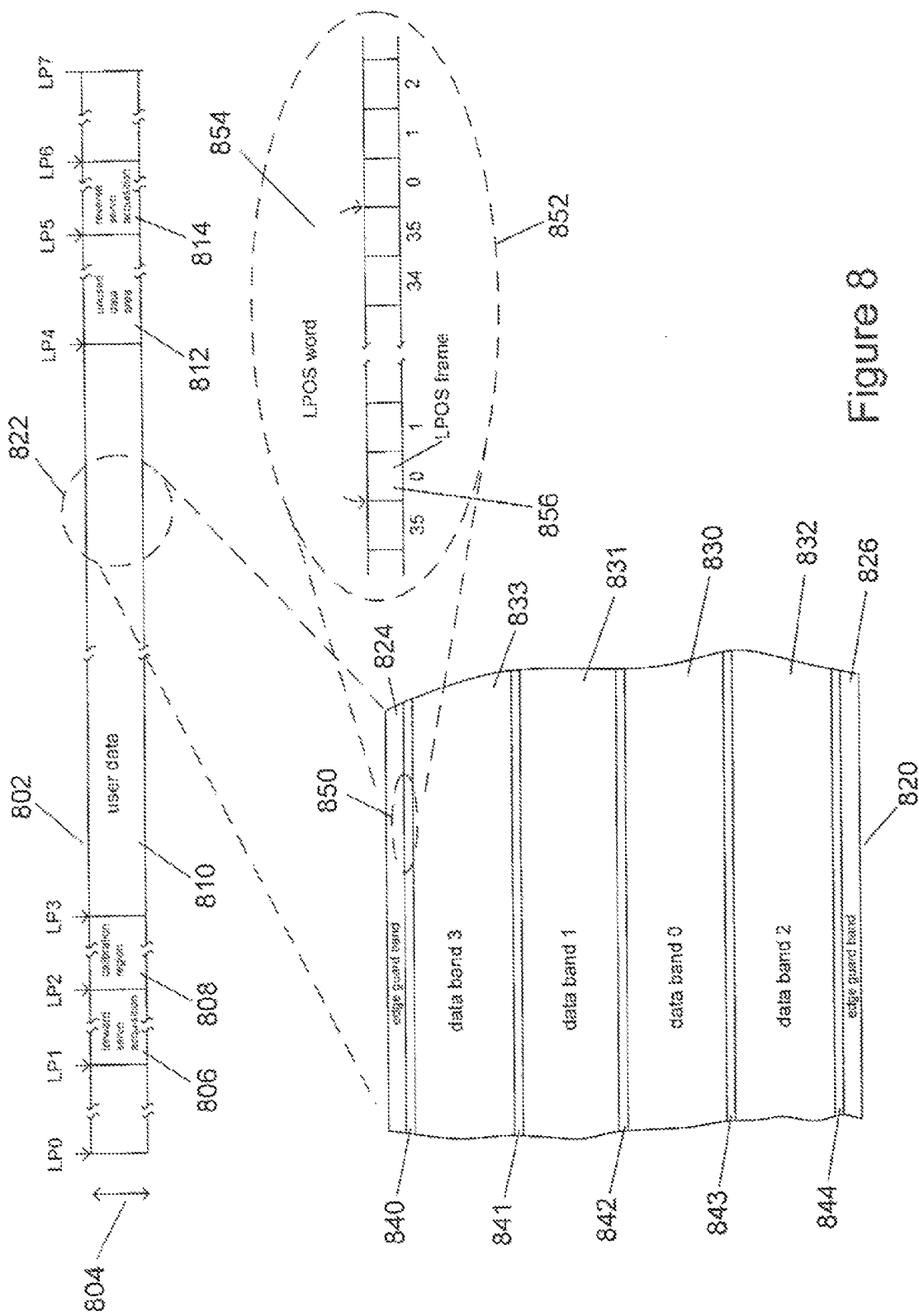
FIG. 8 shows the structure and formatting of a magnetic tape.

FIG. 8 shows the structure and formatting of a magnetic tape. The magnetic tape 802, according to the LTO-4 magnetic-tape technology standard, is 12.65 mm wide 804 and up to 820 meters long. The magnetic tape comprises a base substrate, such as polyethylene terephthalate, coated with a layer of ferromagnetic material dispersed in a suitable binder. A tape is divided into seven logical regions by the seven logical points LP0, LP1, . . . , LP7 shown above tape 802 in FIG. 8. These regions include a forward servo acquisition region 806, a calibration region 808, a user data region 810, an unused data region 812, which may have 0 length, depending on configuration of the magnetic tape, and a reverse servo acquisition region 814. An LTO-4 generation tape, a portion of which is shown in closer view 822 in FIG. 8, is horizontally divided into top 824 and bottom 826 edge-guard bands and four data bands 830-833 interleaved between five servo bands 840-844. Each servo band comprises a sequence of longitudinal-position ("LPOS") words. In FIG. 8, a small portion 850 of servo band 840 is shown in a closer view 852. Each LPOS word 854 comprises 36 LPOS frames, such as LPOS frame 856. Each LPOS word encodes a synchronization mark, a longitudinal-position value, and optional manufacture data. Each LPOS frame encodes one bit of data. The servo bands are written as part of magnetic-tape manufacture.

Figure 9A:
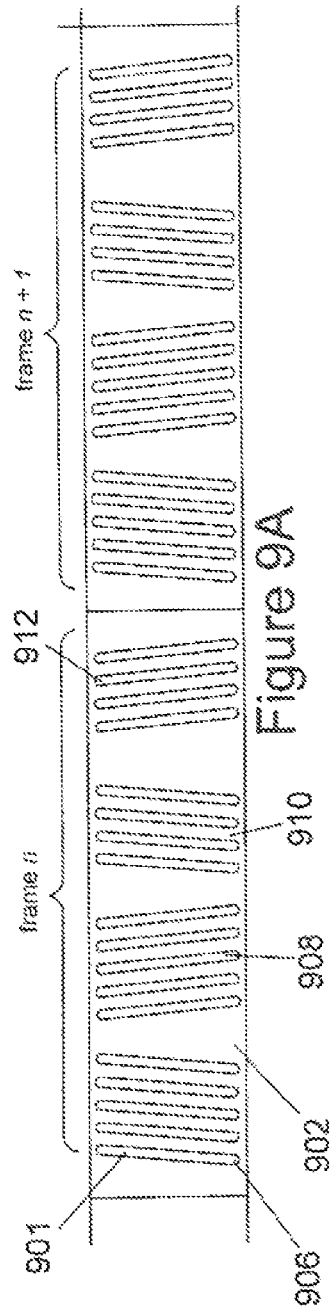
FIGS. 9A-C illustrate the contents of longitudinal position frames.
Figure 9B:
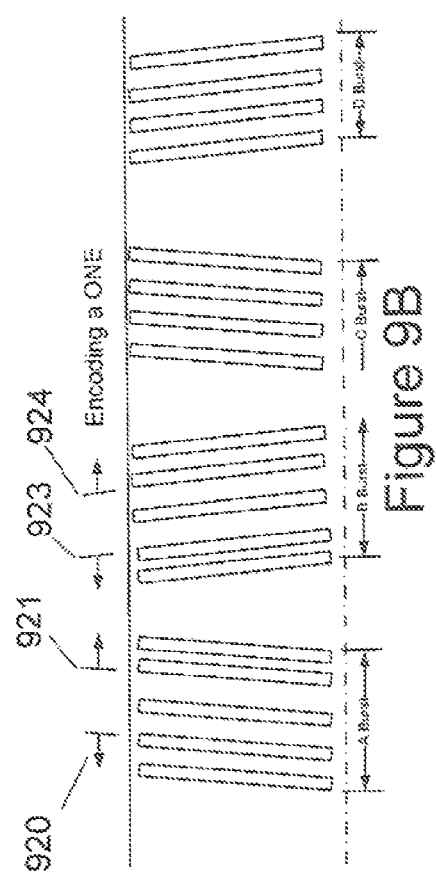
Figure 9C:
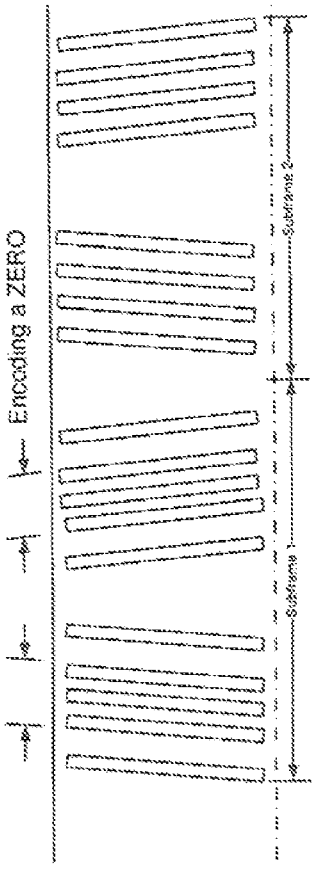

FIGS. 9A-C illustrate the contents of longitudinal position frames. FIG. 9A shows two contiguous LPOS frames within an LPOS word. Each frame, such as frame 902, includes four groups of slanted stripes, such as stripe 904. The four groups of stripes include an A group 906, a B group 908, a C group 910, and a D group 912. A binary "1" value is encoded, as shown in FIG. 9B, within the A and B sets of stripes by moving the second stripe in both the A and B sets towards the first stripe and the fourth stripe in both the A and B sets towards the fifth stripe, as indicated by the arrows 920-923 above those stripes in FIG. 9B. A binary "0" value is encoded by moving the stripes in the opposite direction, as shown in FIG. 9C. The stripes are magnetized regions on the surface of tape. The stripes are slanted so that the interstripe spacing varies in a direction perpendicular to the edges of the tape. This variation in interstripe spacing is used by the servo controller to infer a position of the tape head with respect to a vertical axis superimposed over the servo band. As discussed in detail, below, an LTO-4 servo controller can position the tape head accurately in 14 different vertical positions corresponding to the 14 different tracks within each sub-band of a data band, discussed below, by reference to the servo bands between which the data band is interleaved.

Returning to FIG. 8, the data bands 830-833 of an LTO-4 magnetic tape are interleaved between five servo bands 840-844. A tape is written by writing data to each of the four data bands in sequential order. In other words, data band 0 (830) is written first, followed by data band 1 (831), data band 2 (832), and finally data band 3 (833).

Figure 10:
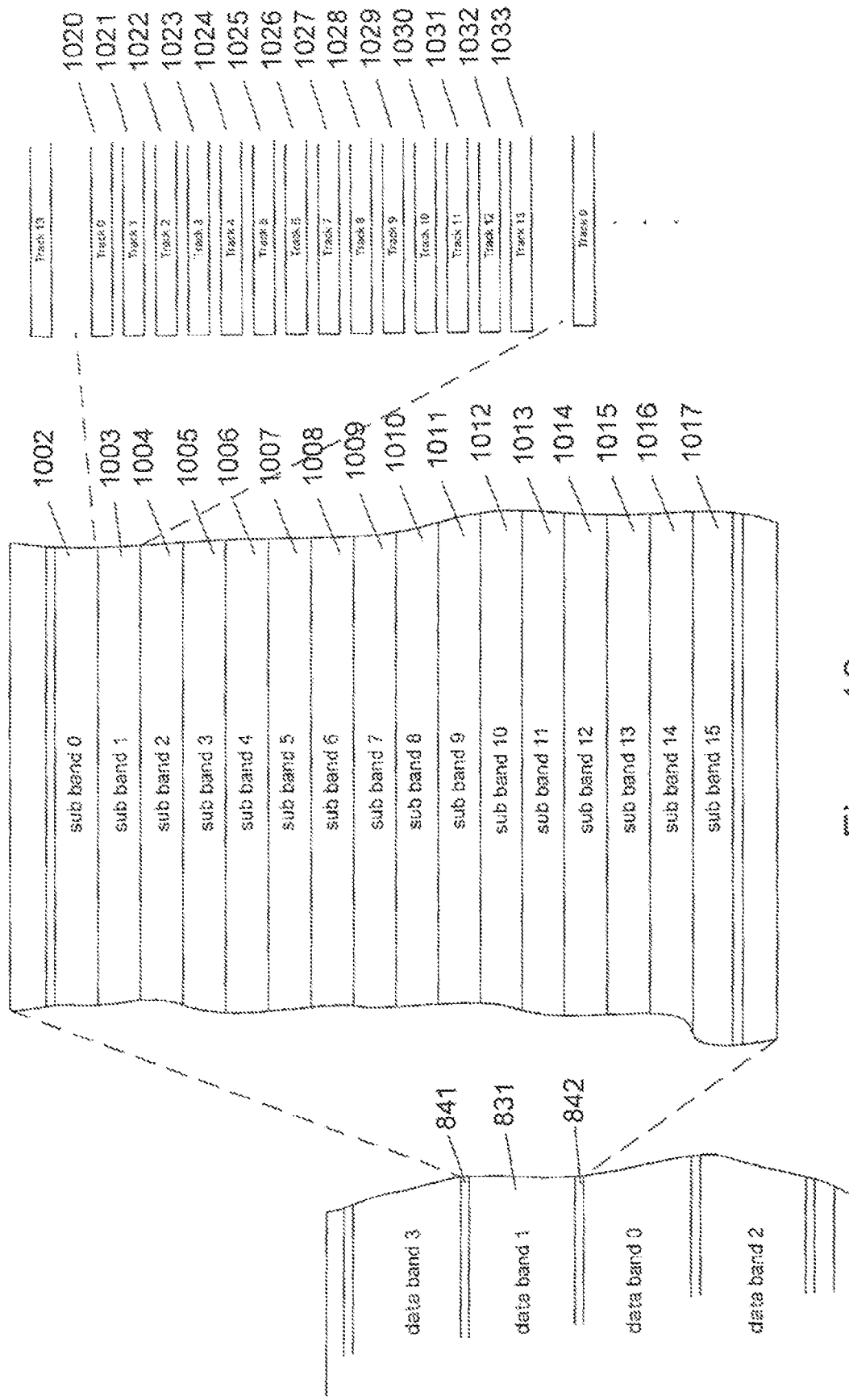
FIG. 10 shows the format structure of a data band.

FIG. 10 shows the format structure of a data band. As shown in FIG. 10, a data band 831, bounded on each side by servo bands 841 and 842, is divided into 16 sub-bands 1002-1017. As also shown in FIG. 10, each sub-band, such as sub-band 1003, is, in turn, divided into 14 different data tracks 1020-1033. Returning to FIG. 7, when a tape head is positioned over a data band, such as data band 831, in order to read data from, or write data to, the data band, the two servo tape-head element pairs 722 and 746 are positioned over the bounding servo bands, such as servo bands 841 and 842, and each read/write element pair is positioned over a different sub-band. In other words, each of the 16 sub-bands 1002-1017 corresponds to a different read/write element of the tape head. When data is being written to, or read from, the tape, all 16 read/write element pairs are active, and data is actively written to, or read from, all 16 sub-bands within a data band. There are 14 different positions in a data band that the tape head can assume, corresponding to the 14 different data tracks 1020-1033 within each sub-band of the data band.

Figure 11:
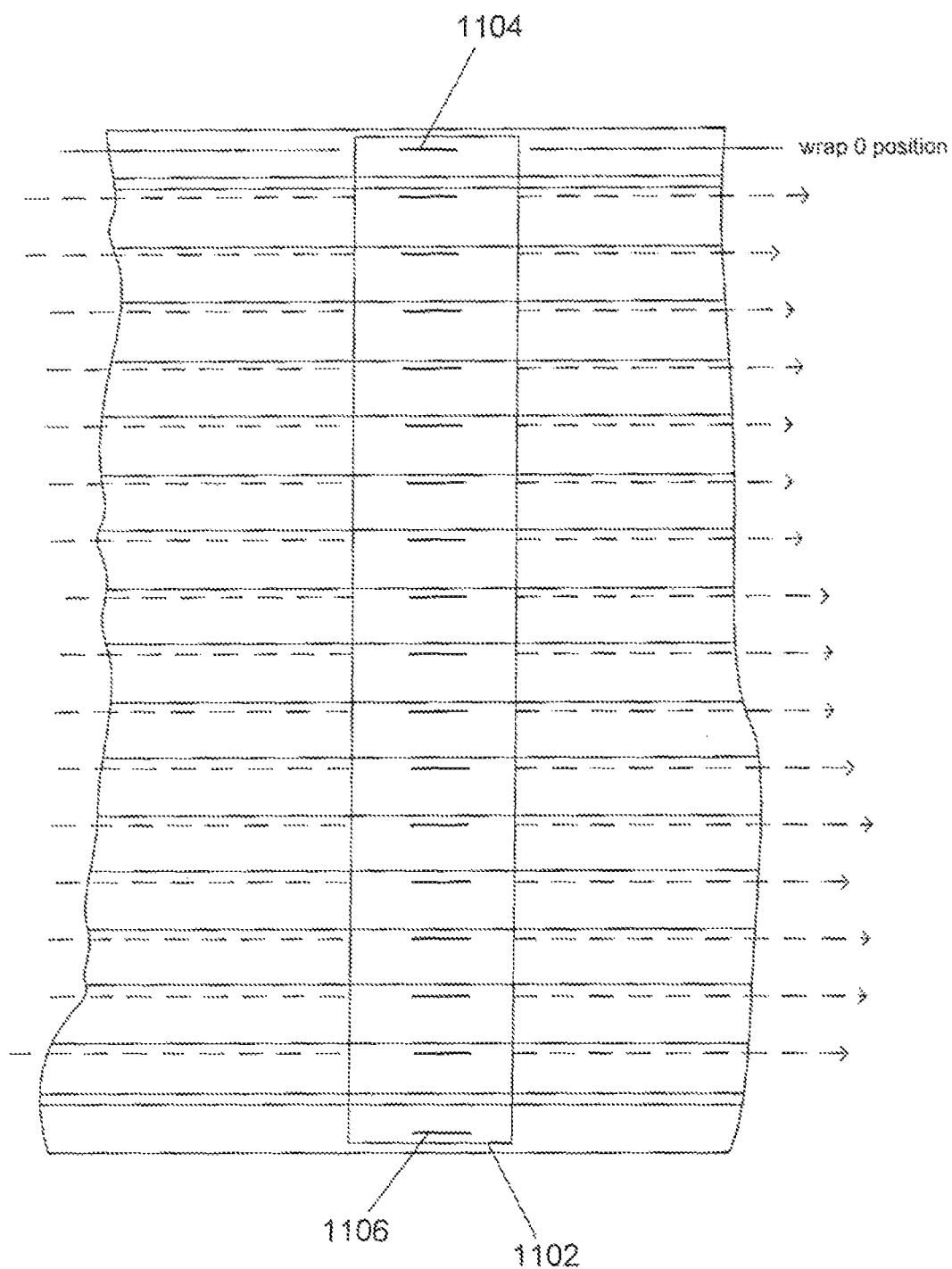
FIG. 11 illustrates a magnetic-tape head positioned over a data band and two bounding servo bands of an LTO-4 generation magnetic tape.

FIG. 11 illustrates a magnetic-tape head positioned over a data band and two bounding servo bands of an LTO-4 generation magnetic tape. The tape head 1102 is represented as a rectangle with 18 horizontal line segments, such as horizontal line segment 1104, representing the 18 different tape-head element pairs. The tape head is positioned to read or write the first data track, track 0 (1020 in FIG. 10), of each of the 16 sub-bands (1002-1017 in FIG. 10) of one data band (831 in FIG. 10) of an LTO-4 generation magnetic tape. As discussed above, positioning of the tape head relative to the data tracks is controlled by the servo controller, which senses the vertical position of the tape head within the servo band using data provided by servo tape-head elements 1104 and 1106. As discussed above, the frequencies of the analog signals produced by the servo tape-head elements is related to the distances between the slanted stripes within LPOS frames at the current tape-head position.

Figure 12A:
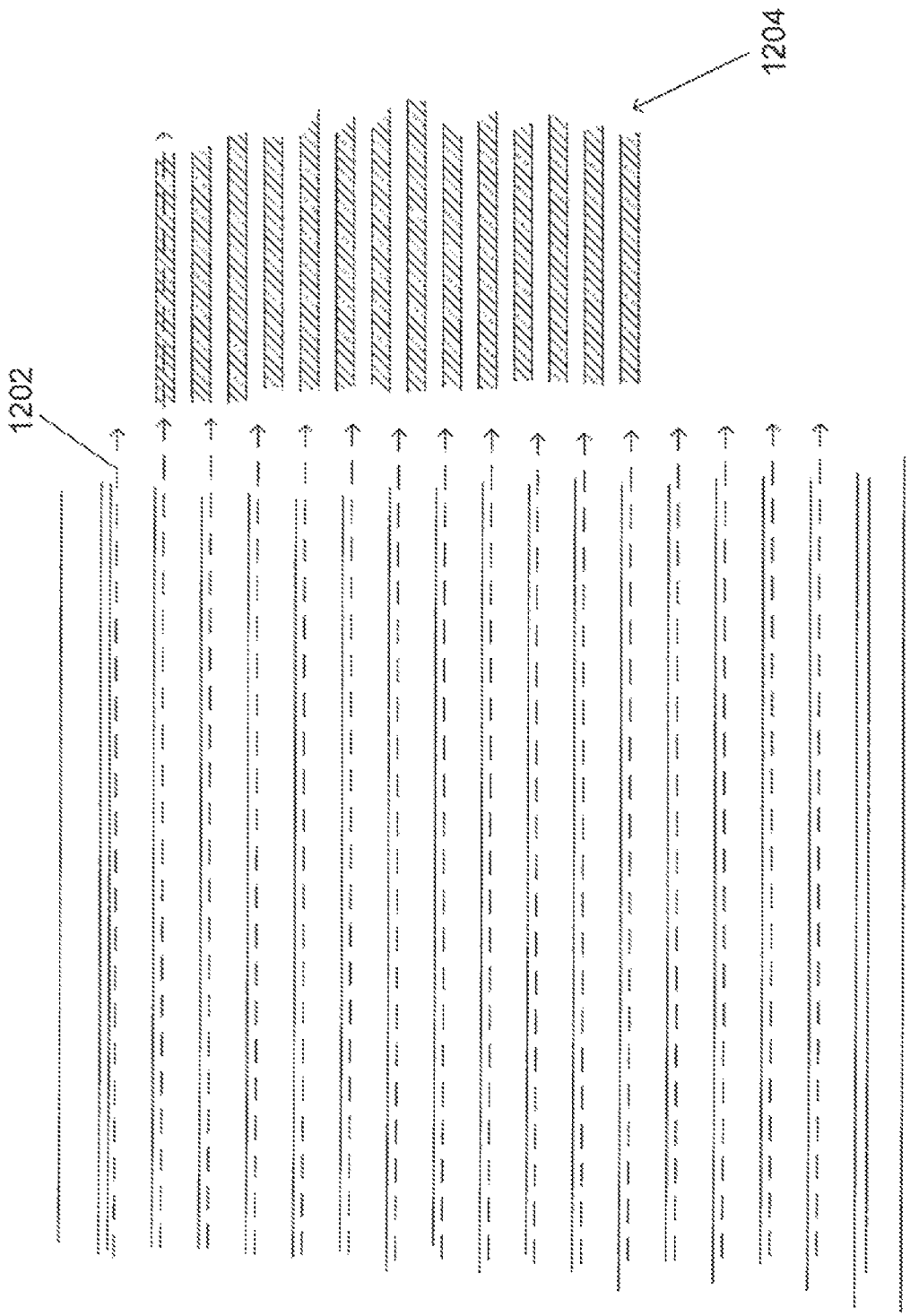
FIGS. 12A-B illustrate writing of the first two tracks of each sub-band within a data band of an LTO-4 generation magnetic tape.
Figure 12B:
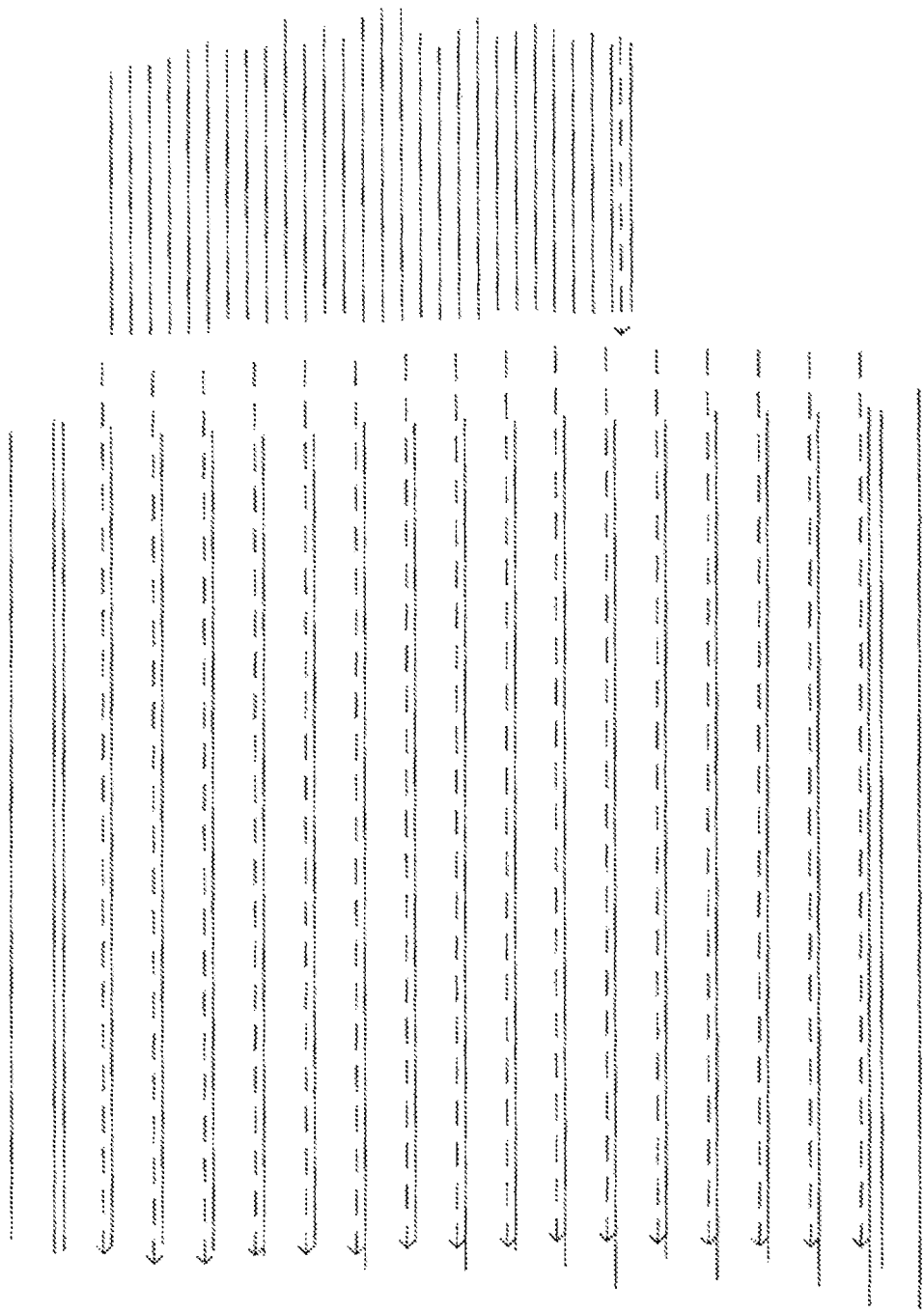

FIGS. 12A-B illustrate writing of the first two tracks of each sub-band within a data band of an LTO-4 generation magnetic tape. In FIG. 12A, the magnetic tape is moved in a forward direction, from cartridge to take-up reel, over the tape head, positioned as shown in FIG. 11, so that each read/write tape-head element pair is aligned with the first track, track 0, within each sub-band. Thus, in FIG. 12A, the dashed lines, such as dashed line 1202, represent the trajectory, or path, of the tape with respect to a read/write element pair of the tape head. The entire length of the data portion of the tape is written, in the forward direction, with the tape head positioned as shown in FIG. 11 to complete a first forward-direction pass of the tape. Thus 16 data tracks (data track 0 in each of the 16 sub-bands) are written from beginning to end in a single pass, also referred to as "wrap 0." In FIGS. 12A-B, the position of a read/write tape-head element pair is also shown with respect to the 14 data tracks 1204 of a sub-data band. When there is more data to be written, data writing continues, as shown in FIG. 12B, in a second, reverse-direction pass, with the magnetic tape wound from the take-up reel back to the cartridge spool. In this case, the tape head is repositioned so that each read/write element pair is positioned over the final track, track 13 (1033 in FIG. 10) of each data sub-band, as shown in FIG. 12B. In the second, reverse-direction pass, data track 13 of all 16 data sub-bands is written in the reserve direction from the end of the user-data area to the beginning of the user-data area, as shown in FIG. 12B. This second, reverse-direction pass constitutes a second wrap, or wrap 1.

Figure 13:
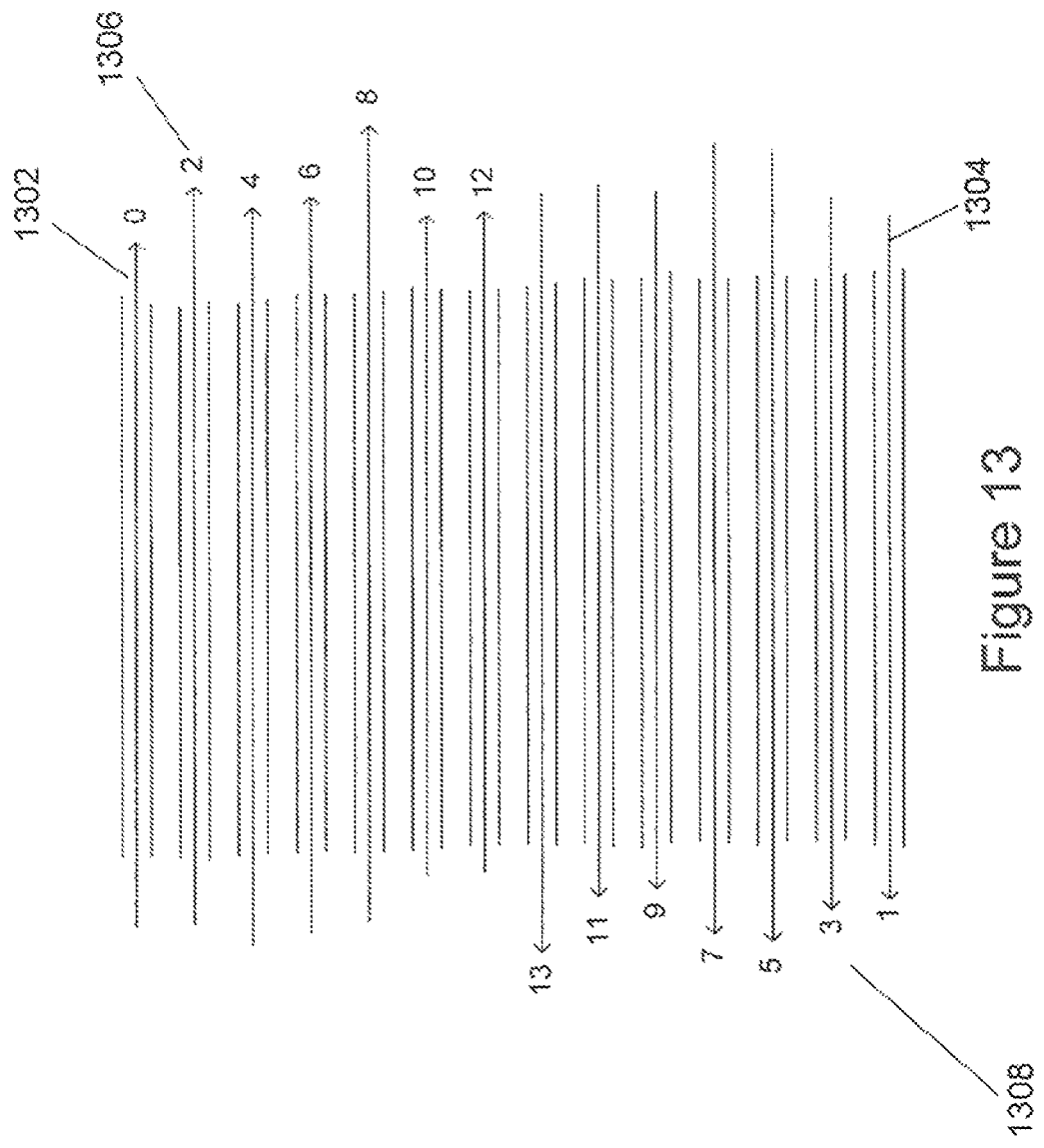
FIG. 13 illustrates the 14 wraps associated with each data band.

FIG. 13 illustrates the 14 wraps associated with each data band. As discussed with reference to FIGS. 12A-B, wrap 0 1302 includes data track 0 of each data sub-band of data band 0, accessed in the forward direction. Wrap 1 1304 includes data track 13 of each data sub-band of data band 0, accessed in the reverse direction. Wrap 2 1306 includes data track 1 of each data sub-band of data band 0, accessed in the forward direction, and wrap 3 1308 includes data track 12 of each data sub-band of data band 0, accessed in the reverse direction. The wraps continue, in serpentine order, from the outer tracks to the interior tracks of each data sub-band. Because there are four data bands within an LTO-4 generation magnetic tape, there are a total of 4×14=56 wraps, or unidirectional passes over the tape, and the total of 4×14×16=896 data tracks.

Figure 14:
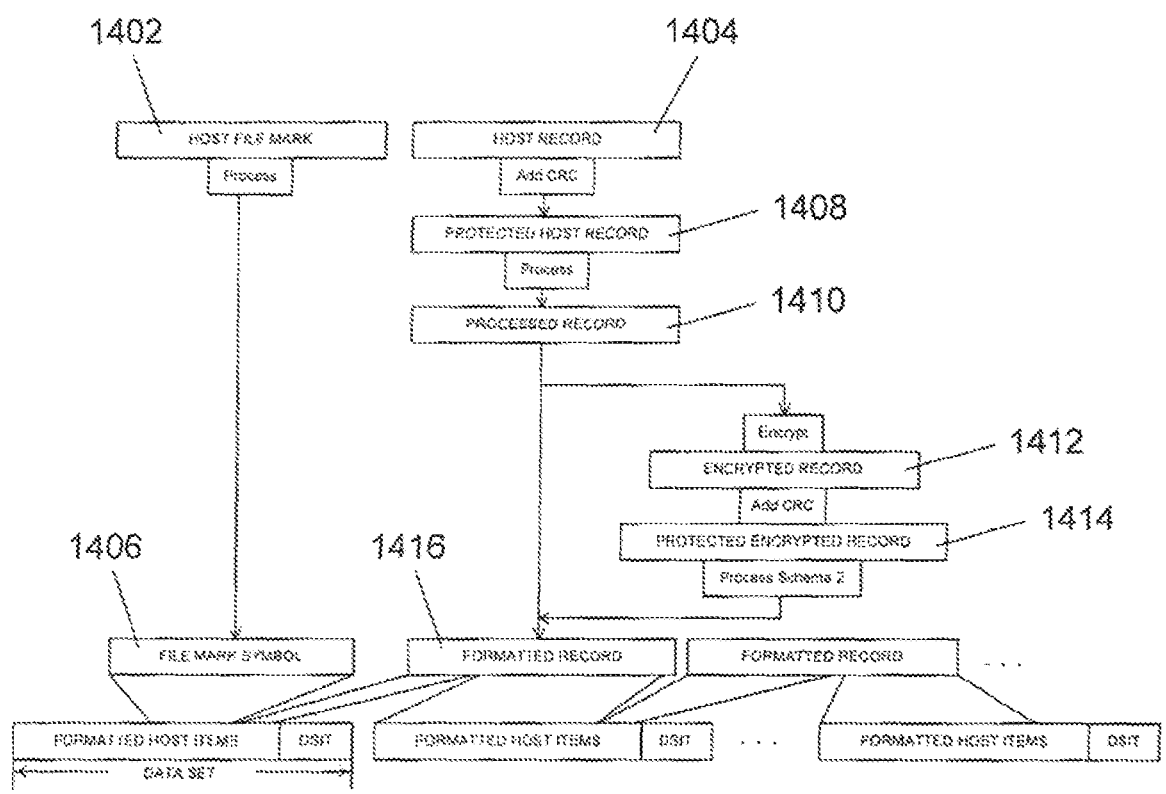
FIG. 14 illustrates formatting of host data for writing to tape.

FIG. 14 illustrates formatting of host data for writing to tape. Host data is essentially formatted into a symbol stream, each symbol represented by a byte. These bytes are then encoded by application of an error-correcting-code ("ECC") into an encoded-symbol-stream matrix which is then written across the sub-bands of a data band. Host file marks 1402 and host data records 1404 are received through the communications medium from host computers. A received host file mark 1402 is processed into a file-mark symbol 1406 for inclusion into a data set. A four-byte CRC is computed for each received host data record and added to the host data record to produce a protected host record 1408. A data-compression method is applied to the protected host record to produce a processed record 1410. The processed record 1410 can be optionally encrypted to produce an encrypted record 1412, to which an additional four-byte CRC is appended to produce a protected encrypted record 1414. The protected encrypted record 1414 is processed to produce a formatted record 1416. When no encryption is applied, the processed record 1410 is used as the formatted record 1416. Formatted records are added to the formatted symbol stream. The formatted symbol stream is partitioned into data sets, each data set comprising 1,589,300 bytes of user data to which a 460-byte data set information table ("DSIT") is added. Each data set, in turn, is partitioned into 64 data subsets, each containing 24,840 bytes of user data.

Figure 15:
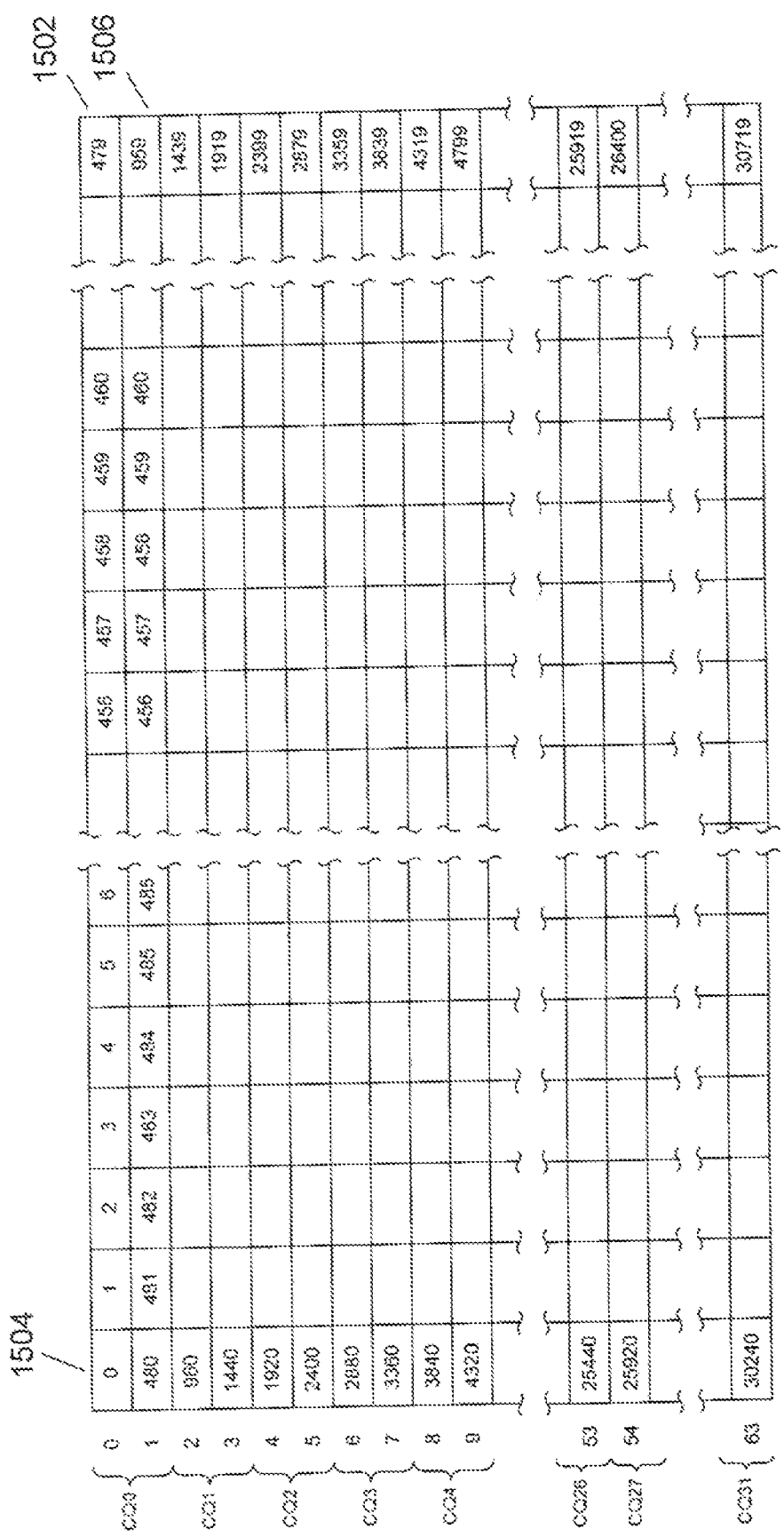
FIG. 15 shows a 64×480 byte table that contains a sub-data and additional parity-check bytes generated by application of two different error-correcting codes.

Each data sub-set is processed to form a matrix of code words. A first ECC encoding method is applied to each group of 460 bytes to produce 20 bytes of parity information that are added to the 460 bytes of user data to form a 480-byte pair of 240-byte ECC-1 codewords. Fifty-four ECC-1 codeword pairs are aligned to produce a 54×480-byte matrix. A second error-correcting code is applied to each column of this matrix to produce an ECC-2 code word combining 54 bytes of clear text and 10 parity-check bytes. Thus, each column of the 54×480 matrix is extended by 10 bytes to produce a final 64×480 byte table. FIG. 15 shows a 64×480 byte table that contains a data subset and additional parity-check bytes generated by application of two different error-correcting codes. Each row of the table, such as row 0 (1502), comprises two ECC-1 code words, including 460 bytes of clear-text user information and 20 parity-check bytes. Each column of the table, such as column 1504, contains 54 bytes of clear-text user data and 10 additional bytes of ECC-2 parity-check data, together forming an ECC-2 code word. Each pair of rows in the table, such as the pair of rows 1502 and 1506, together form a codeword quad ("CQ"). There are 32 CQs within a data subset, as shown in FIG. 15. As data is being written to tape, each read/write element pair of the tape head writes a CQ to each sub-band of a data band. Thus, in two write operations, a data subset is written across all 16 sub-bands of a band.

Figure 16:
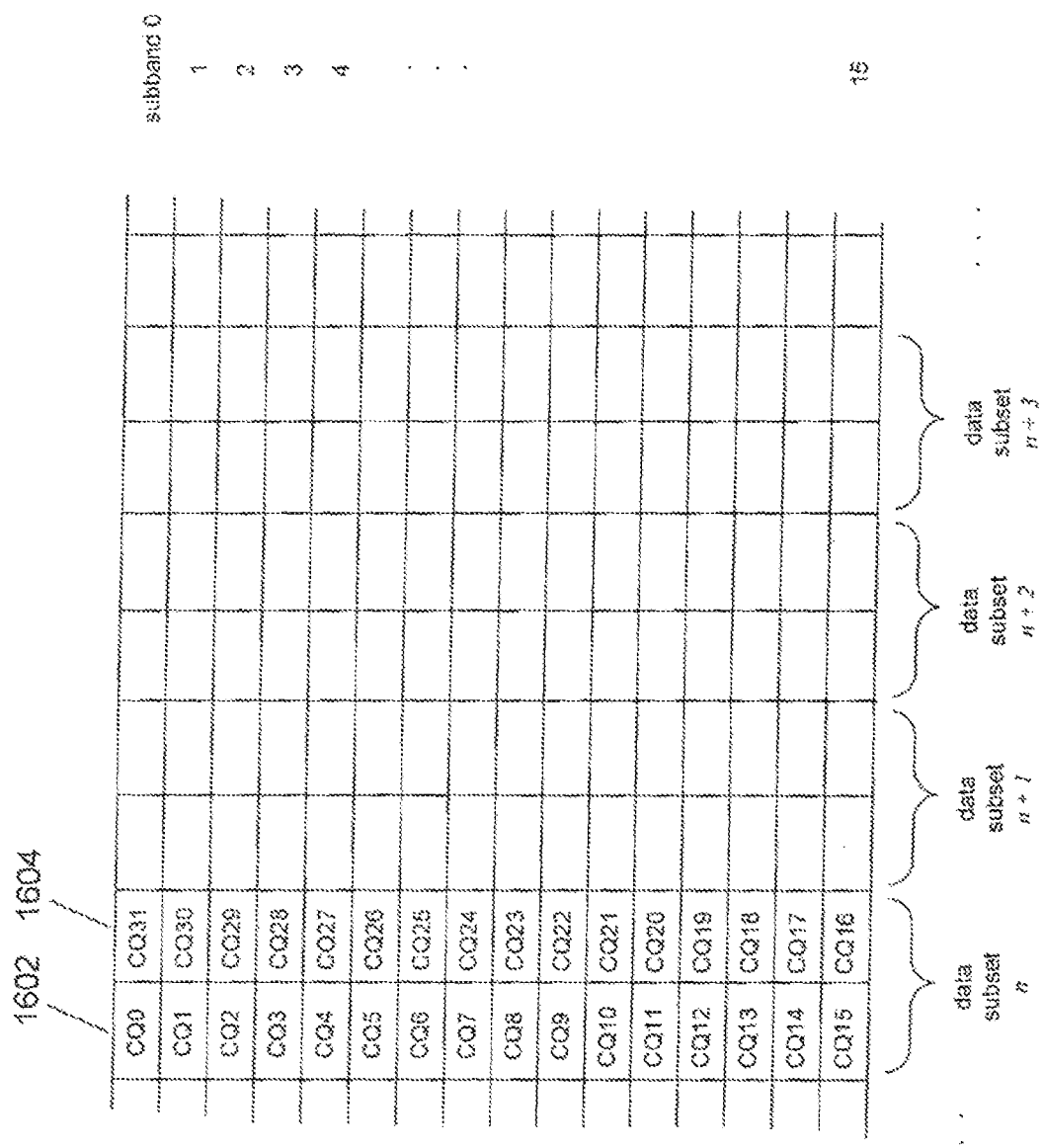
FIG. 16 illustrates writing of data subsets to a physical magnetic tape.

FIG. 16 illustrates writing of data subsets to a physical magnetic tape. The 16 horizontal rows in FIG. 16 correspond to 16 data sub-bands, each corresponding to a single read/write element of a tape head. At any given point in time, 16 CQs are written by the 16 read/write tape-head elements of a tape head to the tape across all 16 sub-bands. Thus, as a magnetic tape is being written in the forward direction, the first 16 CQs of a data subset are simultaneously written across all 16 sub-bands, represented by column 1602 in FIG. 16, and, in the next operation, the remaining 16 CQs of the data subset are written simultaneously across all 16 sub-bands, represented by column 1604 in FIG. 16.

Figure 17A:
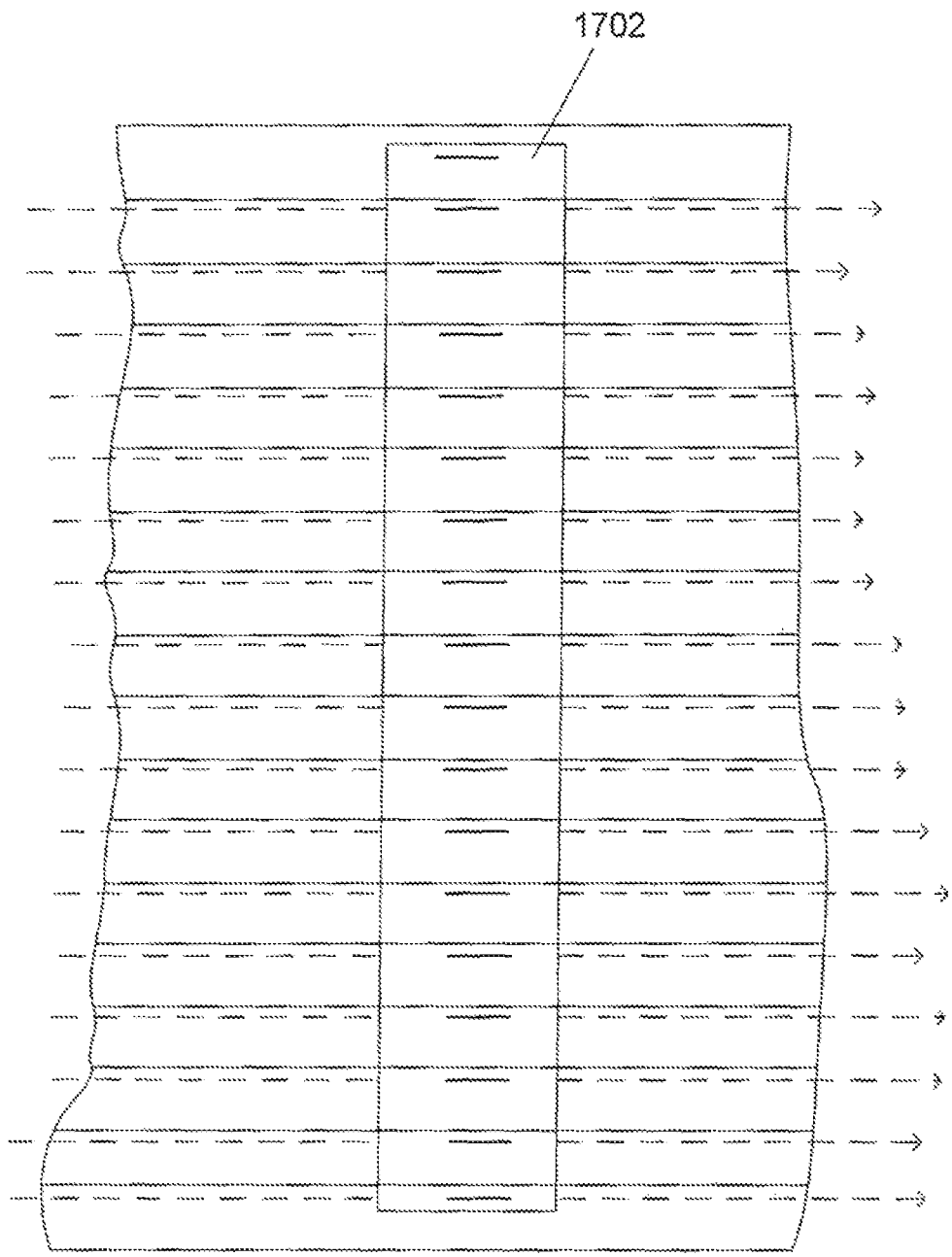
FIGS. 17A-C illustrate tape-head positioning within a data band.
Figure 17B:
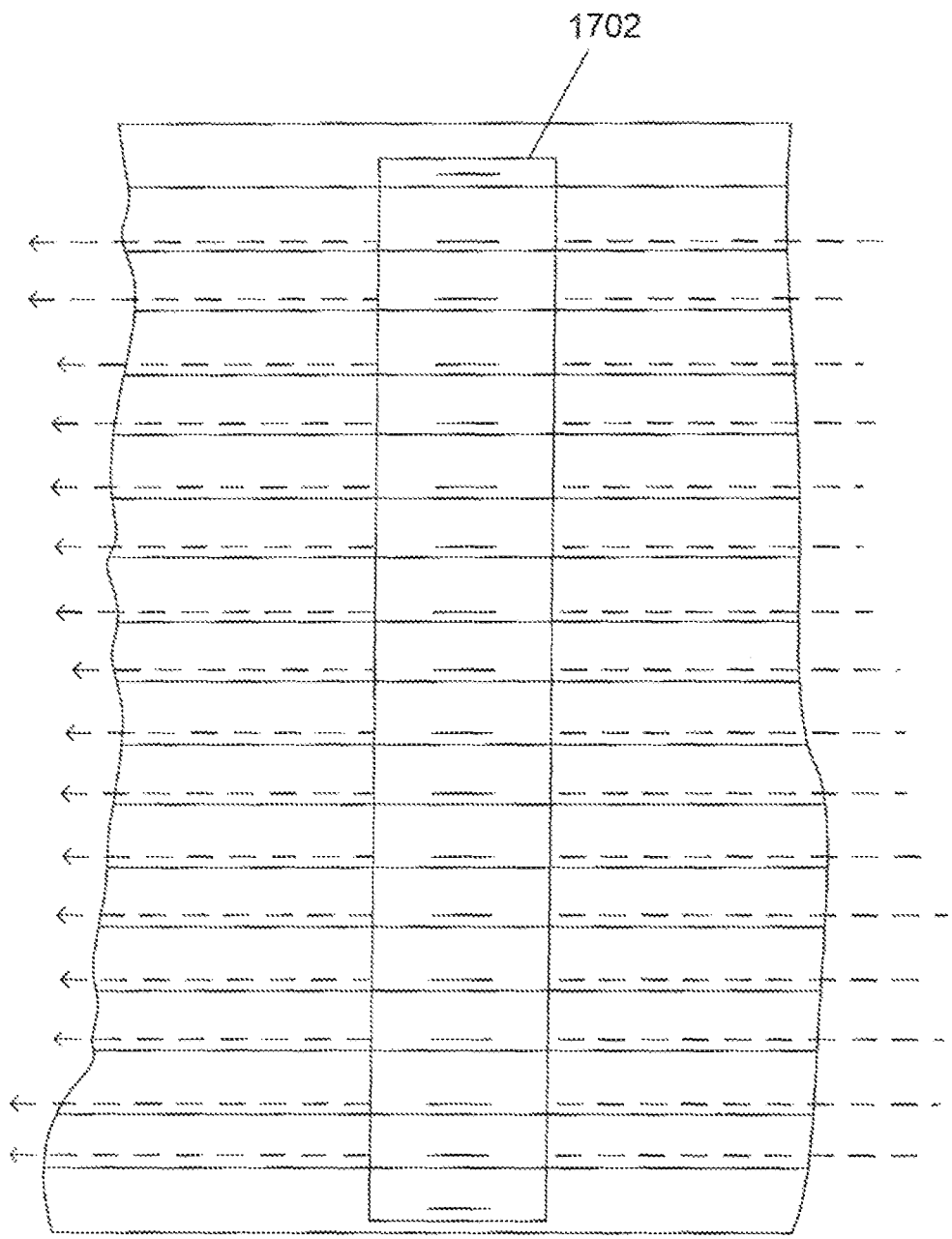
Figure 17C:
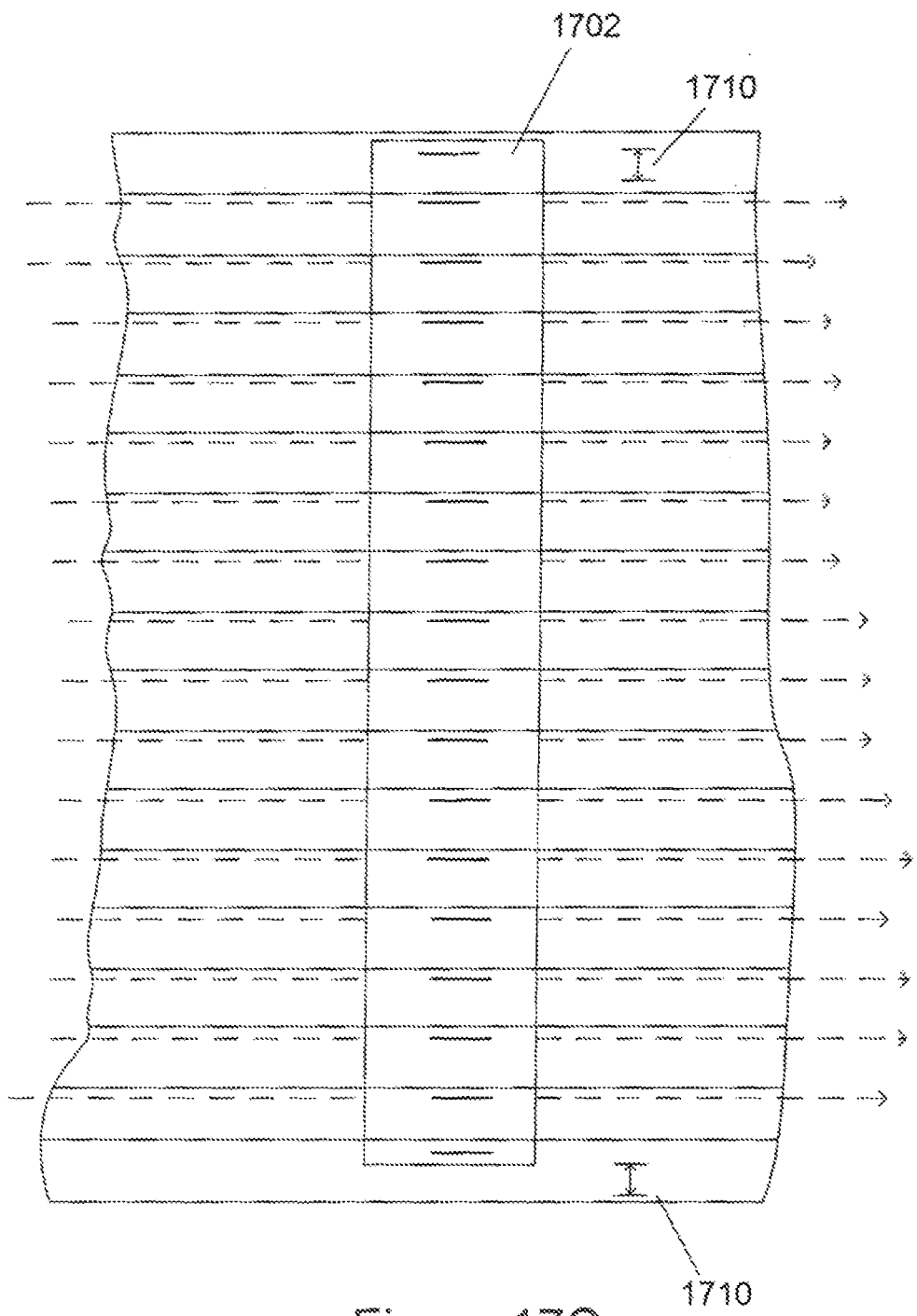

FIGS. 17A-C illustrate tape-head positioning within a data band. In FIG. 17A, the tape head 1702 is positioned to write track 0 of all 16 sub-bands of a data band. In FIG. 17B, the tape head 1702 is positioned to write track 13 of all 16 sub-bands of a data band. In FIG. 17C, the tape head 1702 is positioned to write track 1 of all 16 sub-bands of a data band. Comparing FIGS. 17A-C, it is clear that, in order to access all 14 wraps within a data band, the tape head needs to move over a range of positions 1710 with respect to the servo band. In other words, there are 14 different tape-head positions that correspond to the 14 tracks within each data sub-band within the narrow range 1710 of tape-head positions used for accessing a data band.

Figure 18:
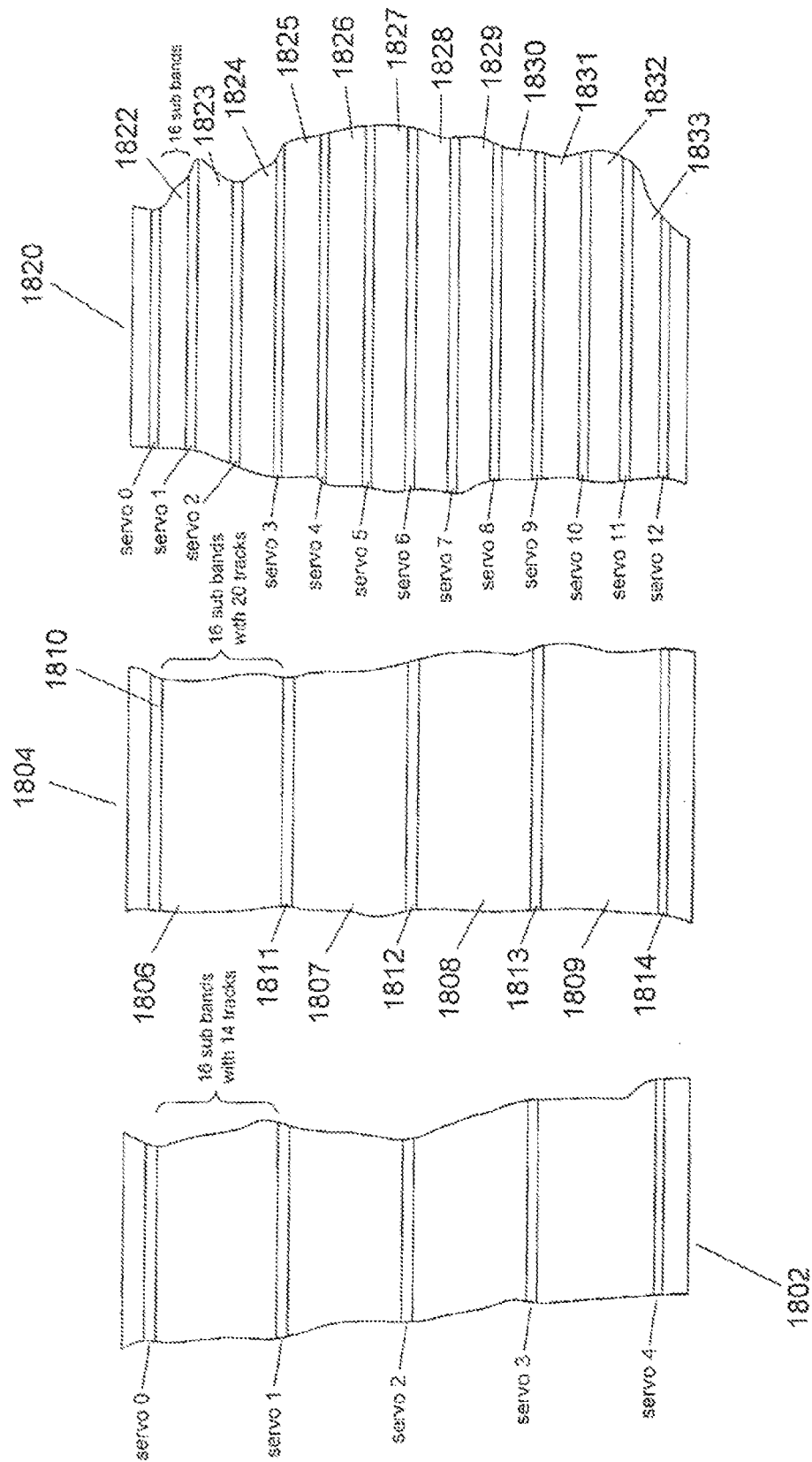
FIG. 18 illustrates one possible evolution of magnetic-tape formats over the LTO-4, LTO-5, LTO-6, and LTO-7 tape-format generations.

FIG. 18 illustrates one possible evolution of magnetic-tape formats over the LTO-4, LTO-5, LTO-6, and LTO-7 tape-format generations. The LTO-4 format 1802 has been described, in great detail, above. In LTO-5 1804, like in LTO-4, there are expected to be four data bands 1806-1809, each with 16 sub-bands, interleaved between five servo bands 1810-1813. However, in the LTO-5 magnetic-tape format, each sub-band is expected to contain 20 tracks, providing a significant increase in track density. The LTO-6 data format 1820 is expected to be significantly different from earlier-generation magnetic-tape formats. In a proposed LTO-6 magnetic-tape format, 12 data bands 1822-1833 are interleaved between 13 servo bands. Each data band is expected to contain 16 sub-bands. The LTO-7 magnetic-tape format is expected to be similar to the LTO-6 magnetic-tape format 1820, with the exception that the number of sub-bands within each data band is doubled in LTO-7, from 16 sub-bands in the LTO-6 magnetic-tape format to 32 sub-bands in the LTO-7 magnetic-tape format.

Designing a tape head compatible both with the LTO-5 and LTO-4 magnetic-tape formats is relatively straightforward. As can be seen in FIG. 18, both magnetic-tape formats have a similar format structure, with the LTO-5 magnetic-tape format having a larger number of narrower data tracks in each data sub-band. However, the widths of the data bands and data sub-bands are identical in LTO-4 and LTO-5 magnetic-tape formats. Thus, an LTO-5 compatible tape head merely needs to have narrower read/write tape-head-element pairs. The distances between the read/write tape-head-element pairs and between read/write tape-head-element pairs and servo-element pairs are identical in both LTO-5-compatible and LTO-4-compatible tape heads. Providing that a magnetic-tape drive is implemented to detect the type of loaded magnetic tapes and to provide appropriate type-specific control, and provided that the servo controller within the magnetic-tape drive is modified to allow positioning of the tape head in 20 different positions within each data band for an LTO-5 tape, but in 14 different positions for an LTO-4 formatted tape, then the magnetic-tape drive can read and write both LTO-5 and LTO-4 magnetic tapes. However, it is clear from FIG. 18 that simply narrowing the read/write tape-head elements and enhancing the servo controller positioning of the tape head is inadequate to allow an LTO-6-compatible tape head to access an LTO-5 or LTO-4 ("LTO-5/4") magnetic-tape. There are 12 data bands in an LTO-6 magnetic tape, rather than four data bands in LTO-5/4 magnetic tapes. The width of the data band is therefore significantly different in LTO-6 magnetic tapes than in magnetic LTO-5/4 tapes, as a result of which the read/write tape-head elements in an LTO-6 tape head must be spaced closer together to access the 16 data sub-bands within each data band.

FIGS. 19A-B illustrates a tape-head configuration that represents one embodiment of the present invention. FIG. 19A shows a diagram of the tape-head configuration that represents one embodiment of the present invention, using illustration conventions similar to those used in FIG. 11 and FIGS. 17A-C. As with previously discussed figures, the rectangular column 1902 represents a tape head, with each horizontal line segment, such as horizontal line segment 1904, representing a tape-head element pair. Longer line segments, such as line segment 1904, are employed to represent LTO-5/4 and LTO-6 servo-element pairs and read/write element pairs that are used to access LTO-5/4 servo bands and tracks. Each tape-head element is labeled with an alphanumeric label, in FIG. 19, indicating the function of the element. For example, element 1904 is labeled "G5 TS." This indicates that the element is the upper servo element for reading LTO-5/4 servo bands. Element 1906, labeled "G5 BS," is the lower LTO-5/4 servo element. There are 16 LTO-5/4 read/write tape-head-element pairs labeled "G5 D0," "G5 D1," . . . , "G5 D15." Thus, LTO-5/4 servo elements 1904 and 1906, along with the LTO-5/4 read/write tape-head-element pairs 1908-1923, correspond to the 18 tape elements shown in FIG. 7, above.

In addition, the tape head 1902 that represents one embodiment of the present invention includes two LTO-6 servo element pairs 1930 and 1932 and 16 LTO-6 read/write tape-head-element pairs arrayed between the LTO-6 servo elements 1930 and 1932. Certain of these LTO-6 read/write tape-head-element pairs are used exclusively for LTO-6 data tracks, such as LTO-6 read/write tape-head-element pair 1934, and are represented using relatively short line segments. Others are dual-use read/write tape-head-element pairs that are used both for LTO-6 as well as LTO-5/4 data tracks, including read/write tape-head-element pair 1913, and are represented by relatively longer line segments. FIG. 19B shows the tape head 1902 that represents one embodiment of the present invention superimposed over an LTO-5/4 data band. All of the LTO-5/4 tape elements are seen to overlie their corresponding servo bands or data sub-bands.

Figures 20A, 20B:
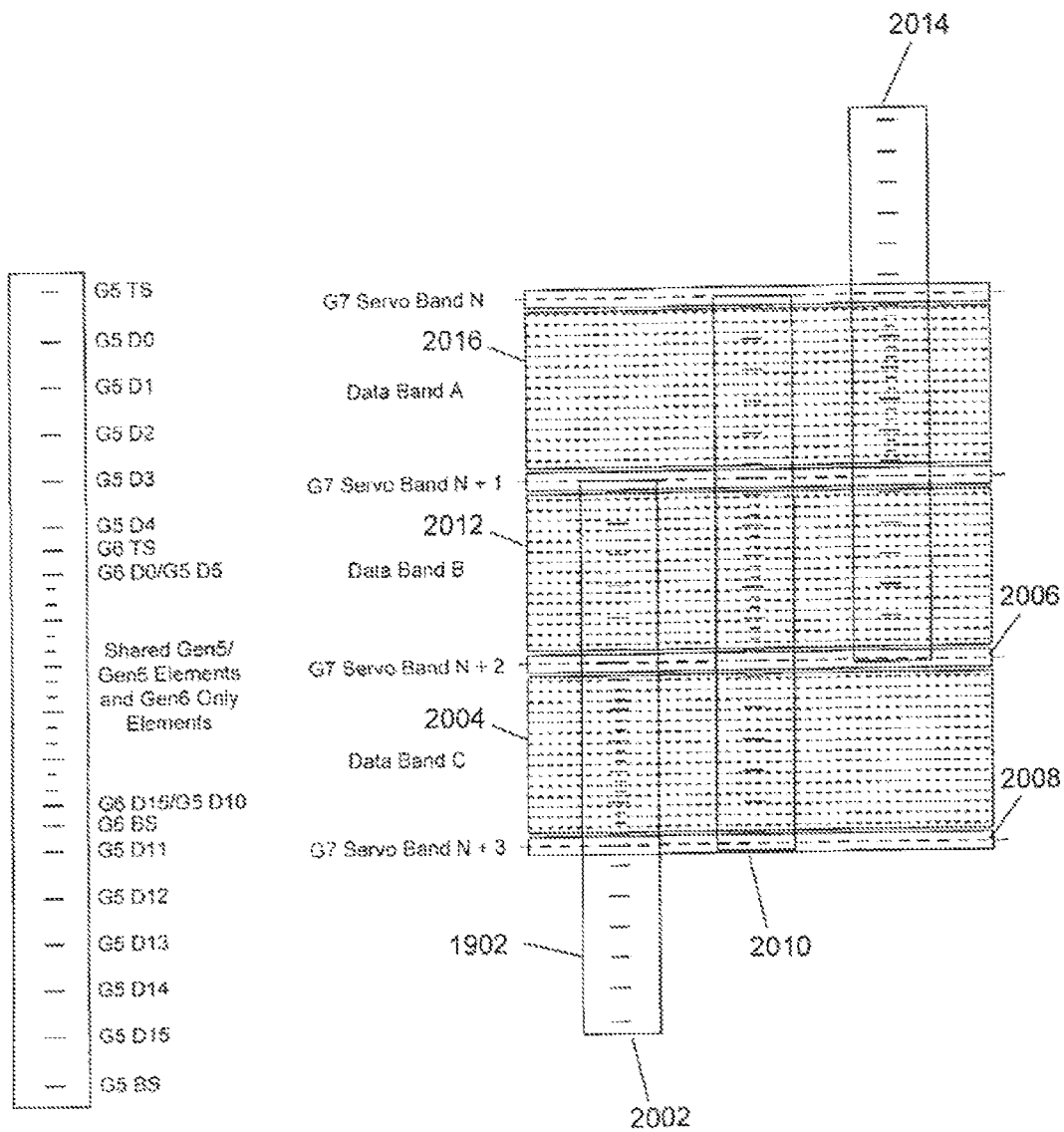
FIGS. 20A-B shows a tape head that represents one embodiment superimposed, in three different positions, over three different data bands of an LTO-6 format tape.

FIG. 20A shows the tape-head configuration for the tape head that represents one embodiment of the present invention. FIG. 20B shows the tape head that represents one embodiment of the present invention superimposed, in three different positions, over three different data bands of an LTO-6 format tape. In a first position 2002, the 18 LTO-6 tape elements overlie the tracks of data band C 2004 and the servo bands 2006 and 2008 bounding data band C 2004. In a second position 2010, the tape head is positioned to access the tracks of data band B 2012. In a third position 2014, the tape head is positioned to access the data tracks of data band A 2016.

There are numerous design constraints that influence a tape-head configuration, such as the tape-head configuration 1902 in FIGS. 19A-20B. First, the number of tape-head elements needs to be minimized. As one example, an alternative configuration would be to provide 16 LTO-5/4 tape-head elements in a first portion of the tape head and 16 LTO-6 tape-head elements in a second portion of the tape head. However, such a configuration would significantly lengthen the tape head, and provide additional fabrication challenges, including a likelihood of decreased yields due a greater total number of elements. The length and aspect ratio of a tape head are also important considerations. A tape head needs to have mechanical stability, and needs to be balanced to avoid irregular wear that might result from constant abrasion from the rapidly moving magnetic tape. When the uppermost and lowermost bands of an LTO-6 tape are accessed, the tape head that represents one embodiment of the present invention extends, by about ⅓ of its length, past the tape edge. When a tape head extends past the tape edge, the possibility of uneven tape-head wear and potential damage to magnetic tapes due to uneven tape-head wear increases. Therefore, the degree to which the tape head extends past the tape head when reading and/or writing the uppermost and lowermost bands needs to be minimized. For these and other reasons, tape-head embodiments of the present invention interleave LTO-6 tape-head elements between LTO-5 tape-head elements, and employ dual-format tape-head elements, when possible, to avoid unnecessary extension of the tape head past the magnetic-tape edges. For an LTO-5/4-compatible LTO-6 magnetic-tape head, the maximum extension past a magnetic-tape edge should be about ⅓ of the total length of the tape head, and definitely less than 36% of the tape-head length, where the tape-head length is the length of the active region of the tape head, as discussed with reference to FIG. 7.

Figure 21A:
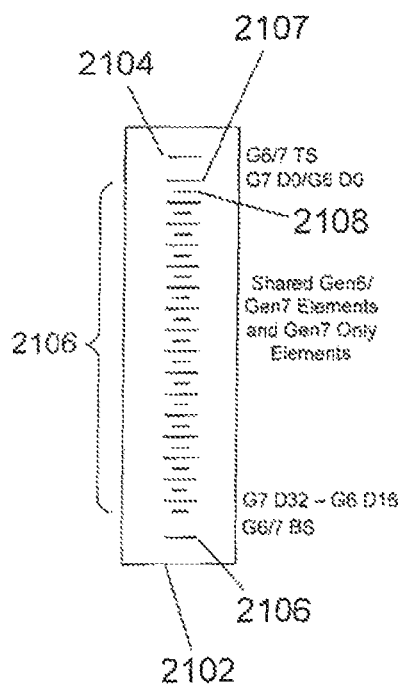
FIGS. 21A-B shows a second tape-head-configuration embodiment.
Figure 21B:
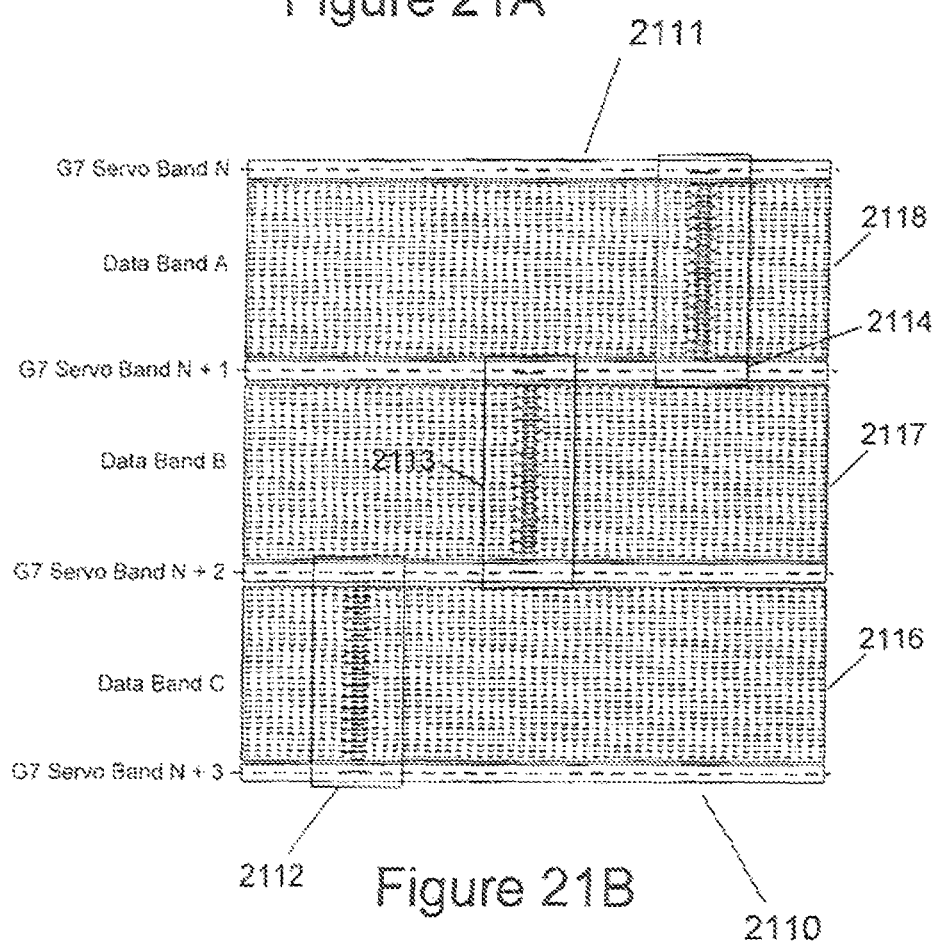

FIG. 21A-B shows a second tape-head-configuration embodiment of the present invention. FIG. 21A shows a tape head configuration 2102 for an LTO-7 tape head that is compatible with LTO-6 formatted tapes. In this case, the tape head has two servo elements 2104 and 2106 that are compatible with both LTO-7 and LTO-6 server bands. Between the two servo elements are 32 read/write tape-head-read/write element pairs 2106. Half of these read/write tape-head-element pairs, including tape-head-element pair 2107, are dual-use read/write elements that read and write data from both LTO-7 and LTO-6 format data tracks, while the other half the read/write tape-head-element pairs, including read/write tape-head-element pair 2108, access only LTO-7 format data tracks. The dual-use read/write tape-head-element pairs alternate with the LTO-7-only read/write tape-head-element pairs along the length of the tape head. Diagram 2110 in FIG. 21 shows a portion of an LTO-7 magnetic tape 2111 with the LTO-7 tape head 2102 positioned in three positions 2112-2114 to access the data tracks of three LTO-7 data bands 2116-2118. In this case, because the data bands of LTO-6 and LTO-7 magnetic tapes have identical widths, the tape-head configuration provides for dual-use servo elements, and the tape head does not extend past the edge of the magnetic tape when accessing even the uppermost and lowermost data bands of either LTO-6 or LTO-7 magnetic tapes.

The programs that run on the microprocessor or microprocessors of a magnetic-tape drive, the servo controllers, and potentially logic circuits and internal signal paths are modified, according to embodiments of the present invention, in addition to using modified tape-head configurations in order to provide backward-compatible magnetic-tape drives. The magnetic-tape drive needs to identify the type of tape, and to control access operations according to the type of magnetic tape being accessed. Signals need to be routed to the appropriate tape-head elements and returned from the appropriate tape-head elements for each magnetic-tape type. Dual-use tape-head elements need to be appropriately sized to be able to access the narrowest data tracks that they may access.

Although the present invention has been described in terms of particular embodiments, it is not intended that the invention be limited to these embodiments. Modifications will be apparent to those skilled in the art. For example, tape-head configurations can be devised, according to embodiments of the present invention, to provide compatibility between a variety of different magnetic-tape formats by introducing sufficient tape-head elements, both single-format elements and multi-format elements, in order to cover the servo bands and data tracks for all of the magnetic-tape formats for which compatibility is desired. Any of a variety of different implementations of the present invention are possible by varying programming parameters, including control and data structure and modular organization, logic-circuitry-design parameters, and other design parameters. Although multi-format-compatible tape heads are discussed, above, similar considerations may apply to producing forward-compatible tape heads and magnetic-tape drives. For example, additional tape-head elements and spacing may be employed to provide potential forward compatibility with as-yet undetermined future magnetic-tape formats. In certain embodiments of the present invention, a tape head may be configured to be compatible with 3 or more different magnetic-tape formats.

The foregoing description, for purposes of explanation, used specific nomenclature to provide a thorough understanding of the embodiments of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A magnetic-tape head used in an electromechanical tape-access component within a magnetic-tape drive, the magnetic-tape head comprising:
a substrate; and
a column including a set of servo elements, a set of single-format tape-head element pairs, and a set of multi-format tape-head element pairs, fabricated on an active portion of the substrate,
wherein the set of servo elements consists of a first servo element and a second servo element, wherein the set of servo elements includes all servo elements of the magnetic-tape head,
wherein the first servo element is disposed at a first end of the column,
wherein the second servo element is disposed at a second end of the column,
wherein the first end and the second end of the column are aligned along an axis perpendicular to the direction of travel of a magnetic tape within the magnetic-tape drive,
wherein the set of single-format tape-head element pairs consists of sixteen single-format tape-head element pairs,
wherein the set of multi-format tape-head element pairs consists of sixteen multi-format tape-head element pairs,
wherein the set of single-format tape-head element pairs are regularly and alternatively interleaved with the set of multi-format tape-head element pairs,
wherein the set of single-format tape-head element pairs and the set of multi-format tape-head element pairs are disposed in the column between the first servo element and the second servo element.

2. The magnetic-tape head of claim 1 wherein the set of single-format tape-head element pairs is compatible with a first magnetic tape formatted according to a first magnetic-tape format which specifies sixteen data bands interleaved between two servo bands.

3. The magnetic-tape head of claim 1, wherein:
the set of single-format tape-head element pairs includes all single-format tape-head element pairs of the magnetic-tape head; and
the set of multi-format tape-head element pairs includes all multi-format tape-head element pairs of the magnetic-tape head.

4. The magnetic-tape head of claim 1, wherein the second servo element is to access a lower servo band, and the first servo element is to access an upper servo band.

5. The magnetic-tape head of claim 1, wherein each single-format tape-head element pair of the set of single-format tape-head element pairs includes a read tape-head element and a write tape-head element.

6. The magnetic-tape head of claim 1 wherein the set of multi-format tape-head element pairs is compatible with the first magnetic tape formatted according to the first magnetic-tape format and with a second magnetic tape formatted according to a second magnetic-tape format, wherein the second magnetic-tape format specifies thirty-two data bands interleaved between two servo bands.

7. The magnetic-tape head of claim 1, wherein each multi-format tape-head element pair of the set of multi-format tape-head element pairs includes a read tape-head element and a write tape-head element.

8. The magnetic-tape head of claim 1, the magnetic-tape drive comprising:
mechanical components for loading a magnetic-tape cartridge, extracting a magnetic tape from the cartridge and positioning the magnetic tape relative to guide rollers and an electromechanical tape-access component;
electrical components that include a processor, formatter, electronic memory, a pre-amplifier bank, and a servo controller; and
the magnetic-tape head subcomponent of the electromechanical tape-access component.

9. The magnetic-tape head of claim 1, wherein the electrical components of the magnetic-tape drive identify a format type of a loaded magnetic tape and control the electromechanical tape-access component to access data tracks of data bands of the loaded magnetic tape according to the identified format type.

10. A method comprising:
providing a multi-magnetic-tape-format-compatible magnetic-tape drive that includes:
mechanical components for loading a magnetic-tape cartridge, extracting a magnetic tape from the cartridge and positioning the magnetic tape relative to guide rollers and an electromechanical tape-access component, electrical components that include a processor, formatter, electronic memory, a pre-amplifier bank, and a servo controller, and a magnetic-tape head subcomponent of the electromechanical tape-access component comprising:
  a substrate, and
  a column including a set of servo elements, a set of single-format tape-head element pairs, and a set of multi-format tape-head element pairs, fabricated on an active portion of the substrate,
  wherein the set of servo elements consists of a first servo element and a second servo element, wherein the set of servo elements includes all servo elements of the magnetic-tape head,
  wherein the first servo element is disposed at a first end of the column,
  wherein the second servo element is disposed at a second end of the column,
  wherein the first end and the second end of the column are aligned along an axis perpendicular to the direction of travel of a magnetic tape within the magnetic-tape drive,
  wherein the set of single-format tape-head element pairs consists of sixteen single-format tape-head element pairs,
  wherein the set of multi-format tape-head element pairs consists of sixteen multi-format tape-head element pairs,
  wherein the set of single-format tape-head element pairs are regularly and alternatively interleaved with the set of multi-format tape-head element pairs,
  wherein the set of single-format tape-head element pairs and the set of multi-format tape-head element pairs are disposed in the column between the first servo element and the second servo element;

identifying, by the electrical components, a format type of a loaded magnetic tape; and controlling the electromechanical tape-access component to access data tracks of data bands of the loaded magnetic tape according to the identified format type.

11. The method of claim 10 wherein controlling the electromechanical tape-access component to access the data tracks further comprises:
  positioning the magnetic-tape head subcomponent over a data band bounded by an upper servo band and a lower servo band; and
  accessing the loaded magnetic tape by using
    the first servo element for accessing the upper servo band, and
    the second servo element for accessing the lower servo band.

12. The method of claim 10 wherein the set of single-format tape-head element pairs is compatible with a first magnetic tape formatted according to a first magnetic-tape format which specifies sixteen data bands interleaved between two servo bands.

13. The method of claim 10 wherein the set of multi-format tape-head element pairs is compatible with a first magnetic tape formatted according to a first magnetic-tape format and with a second magnetic tape formatted according to a second magnetic-tape format, wherein the second magnetic-tape format specifies thirty-two data bands interleaved between two servo bands.

14. The method of claim 10, wherein each single-format tape-head element pair of the set of single-format tape-head element pairs includes a read tape-head element and a write tape-head element.

15. The method of claim 10, wherein each multi-format tape-head element pair of the set of multi-format tape-head element pairs includes a read tape-head element and a write tape-head element.

16. The method of claim 10 wherein:
  the set of single-format tape-head element pairs includes all single-format tape-head element pairs of the magnetic-tape head subcomponent; and
  the set of multi-format tape-head element pairs includes all multi-format tape-head element pairs of the magnetic-tape head subcomponent.

17. A magnetic-tape drive comprising:
  mechanical components for loading a magnetic-tape cartridge, extracting a magnetic tape from the cartridge and positioning the magnetic tape relative to guide rollers and an electromechanical tape-access component;
  a processor;
  electronic memory; and
  a magnetic-tape head subcomponent of the electromechanical tape-access component comprising:
    a substrate, and
    a column including a set of servo elements, a set of single-format tape-head element pairs, and a set of multi-format tape-head element pairs, fabricated on an active portion of the substrate,
    wherein the set of servo elements consists of a first servo element and a second servo element, wherein the set of servo elements includes all servo elements of the magnetic-tape head,
    wherein the first servo element is disposed at a first end of the column,
    wherein the second servo element is disposed at a second end of the column,
    wherein the first end and the second end of the column are aligned along an axis perpendicular to the direction of travel of a magnetic tape within the magnetic-tape drive,
    wherein the set of single-format tape-head element pairs consists of sixteen single-format tape-head element pairs,
    wherein the set of multi-format tape-head element pairs consists of sixteen multi-format tape-head element pairs,
    wherein the set of single-format tape-head element pairs are regularly and alternatively interleaved with the set of multi-format tape-head element pairs,
    wherein the set of single-format tape-head element pairs and the set of multi-format tape-head element pairs are disposed in the column between the first servo element and the second servo element.

18. The magnetic-tape drive of claim 17 wherein the set of single-format tape-head element pairs is compatible with a first magnetic tape formatted according to a first magnetic-tape format which specifies sixteen data bands interleaved between two servo bands.

19. The magnetic-tape drive of claim 17 wherein the set of multi-format tape-head element pairs is compatible with a first magnetic tape formatted according to a first magnetic-tape format and with a second magnetic tape formatted according to a second magnetic-tape format, wherein the second magnetic-tape format specifies thirty-two data bands interleaved between two servo bands.

20. The magnetic-tape drive of claim 17 wherein each single-format tape-head element pair of the set of single-format tape-head element pairs includes a read tape-head element and a write tape-head element.

21. The magnetic-tape drive of claim 17 wherein each multi-format tape-head element pair of the set of multi-format tape-head element pairs includes a read tape-head element and a write tape-head element.

22. The magnetic-tape drive of claim 17 wherein:
the set of single-format tape-head element pairs includes all single-format tape-head element pairs of the magnetic-tape head subcomponent; and
the set of multi-format tape-head element pairs includes all multi-format tape-head element pairs of the magnetic-tape head subcomponent.

* * * * *